(12) United States Patent
Gupta et al.

(10) Patent No.: US 9,443,026 B2
(45) Date of Patent: Sep. 13, 2016

(54) METHOD AND SYSTEM TO UTILIZE SESSION QUERIES IN REAL TIME TO IMPROVE GEO PRECISION OF SPONSORED LISTINGS

(75) Inventors: Ankur K. Gupta, Sunnyvale, CA (US); Arun Kumar Gnanamani, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 583 days.

(21) Appl. No.: 12/979,737

(22) Filed: Dec. 28, 2010

(65) Prior Publication Data

US 2012/0166468 A1 Jun. 28, 2012

(51) Int. Cl.
*G06F 17/30* (2006.01)

(52) U.S. Cl.
CPC ..... *G06F 17/3087* (2013.01); *G06F 17/30864* (2013.01)

(58) Field of Classification Search
CPC .................................................. G06F 17/3087
See application file for complete search history.

(56) References Cited

U.S. PATENT DOCUMENTS

| | | | |
|---|---|---|---|
| 7,076,487 B2* | 7/2006 | Liechty et al. | |
| 7,398,093 B2* | 7/2008 | Hull et al. | 455/456.1 |
| 7,617,203 B2* | 11/2009 | Awadallah et al. | |
| 7,668,536 B2* | 2/2010 | Hull et al. | 455/414.1 |
| 7,739,264 B2* | 6/2010 | Jones et al. | 707/713 |
| 7,739,266 B2* | 6/2010 | Riise et al. | 707/716 |
| 7,921,107 B2* | 4/2011 | Chang et al. | 707/723 |
| 2003/0078924 A1* | 4/2003 | Liechty et al. | 707/7 |
| 2005/0015307 A1* | 1/2005 | Simpson et al. | 705/26 |
| 2005/0027699 A1* | 2/2005 | Awadallah et al. | 707/3 |
| 2006/0136297 A1* | 6/2006 | Willis et al. | 705/14 |
| 2006/0224583 A1* | 10/2006 | Fikes et al. | 707/6 |
| 2006/0224608 A1* | 10/2006 | Zamir et al. | 707/101 |
| 2006/0242017 A1* | 10/2006 | Libes et al. | 705/14 |
| 2006/0271518 A1* | 11/2006 | Wang et al. | 707/3 |
| 2007/0061302 A1* | 3/2007 | Ramer et al. | 707/3 |
| 2008/0114721 A1* | 5/2008 | Jones et al. | 707/2 |
| 2008/0120542 A1* | 5/2008 | Westphal | 715/273 |
| 2008/0243821 A1* | 10/2008 | Delli Santi et al. | 707/5 |
| 2008/0243824 A1* | 10/2008 | Riise et al. | 707/5 |
| 2008/0255937 A1* | 10/2008 | Chang et al. | 705/14 |
| 2008/0301092 A1* | 12/2008 | Jayanti et al. | 707/3 |
| 2009/0094212 A1* | 4/2009 | Zaccagnino | 707/3 |
| 2009/0248663 A1* | 10/2009 | Maniyar et al. | 707/5 |
| 2009/0254512 A1* | 10/2009 | Broder et al. | 707/2 |

(Continued)

*Primary Examiner* — James Trujillo
*Assistant Examiner* — Hubert Cheung
(74) *Attorney, Agent, or Firm* — Brinks Gilson & Lione

(57) ABSTRACT

Contextual or cumulative interpretation is applied to individual user queries to improve the accuracy of sponsored and/or non-sponsored search results. Queries are interpreted based on present features derived from a user query in the context of past features derived from qualified past queries such as those previously received during a user query session. Based on contextual interpretation, present features may be augmented using past features. A search is performed using augmented features instead of present features. Contextual interpretation of queries improves search system understanding of the context in which queries are submitted, which is particularly helpful when interpolating query intent to develop features not expressed in a query. Contextual interpretation permits queries to be interpreted and treated more uniformly and more intelligently. As a result, users and advertisers benefit from more precise sponsored and/or non-sponsored search results. As one example, contextual interpretation can improve the geo-precision of sponsored search results.

20 Claims, 12 Drawing Sheets

(56) References Cited

U.S. PATENT DOCUMENTS

| | | | |
|---|---|---|---|
| 2009/0282013 A1* | 11/2009 | Joshi et al. | 707/5 |
| 2010/0082436 A1* | 4/2010 | Maghoul et al. | 705/14.58 |
| 2010/0257163 A1* | 10/2010 | Ohazama et al. | 707/724 |
| 2011/0173193 A1* | 7/2011 | Ahn et al. | 707/725 |
| 2011/0264656 A1* | 10/2011 | Dumais et al. | 707/728 |
| 2012/0030021 A1* | 2/2012 | Gupta et al. | 705/14.53 |
| 2012/0072281 A1* | 3/2012 | Chang et al. | 705/14.49 |
| 2012/0166416 A1* | 6/2012 | Murdock et al. | 707/711 |

\* cited by examiner

| | Session Id | Past User Query | Past Geo features & Associated Timestamp | Query TimeStamp |
|---|---|---|---|---|
| 610 | S123789 | lake tahoe hotels | "Empty" | t1 |
| 612 | S123789 | lake tahoe weather | Lake Tahoe (t1) | t2 |
| 614 | S123789 | reno resorts | Lake Tahoe (t1, t2) | t3 |
| 616 | S123789 | ski rentals | Lake Tahoe (t1, t2), Reno (t3) | t4 |
| 618 | S123789 | ski reports | Lake Tahoe (t1, t2), Reno (t3) | t5 |

METHOD AND SYSTEM TO UTILIZE SESSION QUERIES IN REAL TIME TO IMPROVE GEO PRECISION OF SPONSORED LISTINGS

BACKGROUND OF THE INVENTION

1. Field of the Invention

The present invention relates to sponsored search and online advertising.

2. Background

A search engine is an information retrieval system used to locate documents and other information stored on a computer system. Search engines are useful at reducing an amount of time required to find information. One well known type of search engine is a Web search engine which searches for documents, such as web pages, on the "World Wide Web" (also known as "the Web"). Examples of such search engines include Yahoo! Search™ (at http://www.yahoo.com), Microsoft Bing™ (at http://www.bing.com), Ask-.com™ (at http://www.ask.com), and Google™ (at http://www.google.com). Online services such as LexisNexis™ and Westlaw™ also enable users to search for documents provided by their respective services, including articles and court opinions. Further types of search engines include personal search engines, mobile search engines, and enterprise search engines that search on intranets, among others.

To perform a search, a user of a search engine typically enters a query into an entry box of the search engine. The query contains one or more words/terms, such as "hazardous waste" or "country music." The terms of the query are typically selected by the user to as an attempt find particular information of interest to the user. The search engine returns a list of documents relevant to the query. In a Web-based search, the search engine typically returns a list of uniform resource locator (URL) addresses for the relevant documents, which is displayed to the user in a search results page. If the scope of the search resulting from a query is large, the returned list of documents may include thousands or even millions of documents.

"Sponsored search" refers to a form of Internet advertising/marketing that enables advertisers to increase their visibility in the results page of a search engine query. According to sponsored search, an advertiser may pay or provide other compensation for having an advertisement appear in a sponsored section of the results page for one or more particular queries. A user who enters one of the queries into the search engine is provided with a results page that includes the advertisement in the sponsored search section. The sponsored search section is prominently displayed in the results page, to enable the user to easily see and interact with the advertisement. In this manner, an advertiser is enabled to provide advertisements to users that are directly related to their queries, and a search engine owner/operator is enabled to further monetize the search engine.

Successful sponsored search advertising often depends on successful determination of the topic a user is inquiring about, which may in turn depend on successful determination of a location a user is inquiring about. The terms location, geo and geo-location are used interchangeably herein to refer to any conceivable location.

Location is typically derived from geo features drawn from three sources. The first source is an expression of geo-intent in a user query. For example, if a user enters queries such as "Lake Tahoe Ski Resorts" or "Lake Tahoe Weather," then the geo feature in each query is explicit, i.e., "Lake Tahoe." However, users do not always make clear the location pertaining to their inquiry. Thus, location may need to be inferred from alternate sources.

The second source is a user's internet protocol (IP) address. For example, if a user does not enter an explicit geo feature, one may be inferred from a user's IP address by mapping the IP address to a location of the computer providing the user query. The third source is a user's registration information. For example, if a user does not enter an explicit geo feature and if a user is registered with an Internet based service or application (e.g., has an account with Yahoo!, Google, etc.), a geo feature may be inferred from the user's registration information such as the user's address.

The clarity of geo intent evident in search queries provided by a user may vary from one query to the next. Likewise, as a user's queries vary, results vary. Application of rules that select and use geo features to derive geo intent of each query may result in search results for successive queries being based on different geo locations that do not accurately reflect geo intent. This may negatively impact user experience as well as advertiser success in reaching potential consumers. Inaccurate understanding of geo intent may under or over utilize a sponsor's geo target ad inventory.

For example, in a first query a user may enter "Lake Tahoe Weather" and in a follow-up query may enter "Ski Resorts." If a user does not live in Lake Tahoe, is not a registered user and/or is not using a computer traceable to Lake Tahoe, sponsored search results returned for the "Ski Resorts" query may be undesirable for the user and sponsors because it is not known that Lake Tahoe was the geo intent of the search.

As another example of a failure to properly interpret a user's geo intent, a user may enter "eiffel tower hotel" in a first query, "paris attractions" in a second query, "things to do in paris" in a third query and "paris casinos" in a fourth query. While the geo intent is properly determined to be "Paris, France" in the first three queries, geo intent may be improperly determined to be "Las Vegas" in the fourth query due to the presence of and website for the Paris Las Vegas Hotel and Casino in Las Vegas.

Hence, to improve the accuracy of sponsored search results to the benefit of users and advertisers, it is important to improve geo precision of sponsored geo-targeted advertisements.

BRIEF SUMMARY OF THE INVENTION

Existing search techniques interpret queries submitted to a search engine individually rather than cumulatively in the context in which they are generated by users. Successive queries by a user may use different words in search of related information to accomplish the same or related tasks. In each successive query, terms may be omitted and others substituted, resulting in inconsistent sets of features. Feature information, such as geo features, may not be similarly or sufficiently expressed in every query. As a result of individual interpretation where features are not carried between queries, successive queries in a query session may be interpreted and treated differently, resulting in reduced accuracy of sponsored and non-sponsored search results.

Applying contextual or cumulative interpretation to user queries recognizes and seeks to benefit from the fact that users often generate a series of searches in a given time interval on a particular topic and/or with a particular goal. Contextual interpretation observes and exploits correlations between successive queries in the same session. As a result, contextual interpretation improves the accuracy of sponsored and non-sponsored search results. It also saves user time and processing time by not forcing users to retype their queries to obtain intended interpretation.

Various approaches are described herein for, among other things, improving the accuracy of sponsored and/or non-sponsored search results by contextual interpretation of user queries. Rather than interpreting queries based on only present features derived from the user query, queries are interpreted based on present features derived from the user query in the context of past features derived from qualified queries such as those received during a user query session. Based on contextual interpretation, present features may be augmented using past features. A search in response to the query is performed using the augmented features rather than the present features.

Contextual interpretation of queries improves search system understanding of the context in which queries are submitted, which is particularly helpful when interpolating query intent to develop features not expressed in a present query.

Contextual interpretation permits queries to be interpreted and treated more uniformly and more intelligently. As a result, users and advertisers receive the benefit of more precise sponsored and/or non-sponsored search results.

Contextual interpretation of user queries is described in terms of the specific example of improving geo-precision of sponsored search results, but contextual interpretation of user queries applies more generally to query features and search results.

In one method implementation of contextual interpretation, a search query input to a search engine is received. The user query is analyzed to determine a present geo feature for the user query and a qualified past geo feature for a past user query. The present geo feature is augmented with the qualified past geo feature. A search result is determined for the augmented present geo feature instead of the present geo feature.

Past geo features are qualified, for example, by determining that present and past queries were received during the same user query session. A session may be general in nature or may be based on a specific type of feature, such as a geo session based on geo context of queries. The existence of a session may be determined by time and/or query context. Query context may be based, for example, on query pattern recognition. Features may also be qualified based on other factors, such as a qualifying time interval between receipt of past and present queries.

Contextual interpretation of search queries using past user queries can be used to determine sponsored and/or non-sponsored search results. In some embodiments, sponsored and non-sponsored search results may be selected based on different query features, e.g., where non-sponsored results are determined by features derived only from a present query while sponsored results are determined by augmented features.

Contextual interpretation of search queries may be selectively applied. For example, contextual interpretation may be applied to queries that fail to express geo intent, but not applied to queries that do express geo intent.

Augmenting present query features may comprise weighting present and past features before merging them together. Weights may be adjusted based on numerous factors such as whether a feature is expressed or implied or based on a time interval between present and past queries on which a past feature is based. Features may be eliminated, for example, based on a failure to meet time and/or weight thresholds or based on duplication of features. Elimination of duplicate features may necessitate reweighting of features whose duplicates were eliminated.

Past features, such as those derived for queries received during a user query session, may be maintained in a data structure. Such a data structure may store, for example, a session identifier, one or more geo features for a particular query and a query timestamp. The data structure may be updated with new entries for each new user query. Entries in the data structure may be removed, for example based on elapsed time and/or other factors, during a garbage collection process.

In another implementation of contextual interpretation of user queries, a search system comprises a session-based query processing module that interprets a user query based on the user query and one or more previous queries accumulated during a session with the user. In one implementation, the session-based query processing module is configured to receive the user query, determine a present feature for the user query, determine a past feature for a past user query received during the session, augment the present feature with the past feature and determine a search result for the augmented present feature instead of the present feature. As with any implementation, sessions may be general or specific to one or more features such as a geo feature and augmented features may be used to determine sponsored results, non-sponsored results, or both.

The session-based query processing module may be implemented in a search engine, an advertising selector, both, or other location. In one implementation, the session based query processing module may comprise a geo identification module that identifies geo features in queries and a geo session cache module configured to store past geo features for past queries. Other modules such as a sponsored search front end, ad selection front end and/or the back end of either may implement aspects of session-based query processing of user queries.

In other implementations of contextual interpretation of user queries, computer program products such as computer readable media may comprise computer-executable instructions to implement session-based processing of individual user queries.

Further features and advantages of the disclosed technologies, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate a plurality of embodiments of the present invention and, together with the description, further serve to explain the principles involved and to enable a person skilled in the relevant art(s) to make and use the disclosed technologies. Unless expressly indicated, each figure represents a different embodiment and components in each embodiment are intentionally numbered differently compared to potentially similar components in other embodiments.

Figure 1:
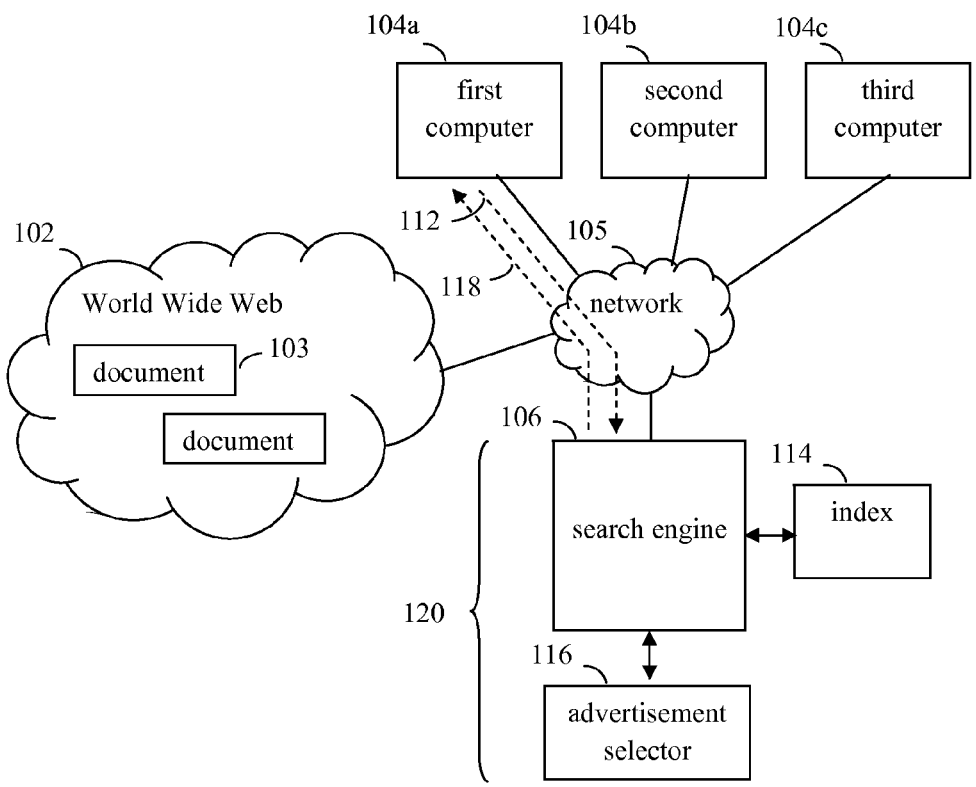
FIG. 1 shows a block diagram of an example search network, according to an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Example embodiments are described in the following sections.

II. Example Embodiments of a Search Environment for Contextual Interpretation of User Queries Using Session-Based Query Processing Embodiments of the present invention enable the selection of more accurate sponsored and/or non-sponsored search results in response to queries submitted in search environments. Embodiments may be implemented in a variety of environments, including sponsored search environments. For instance, FIG. 1 shows a search network 100, which is an example search environment in which sponsored and non-sponsored contextual interpretation of user queries using session-based query processing may be implemented. As shown in FIG. 1, network 100 includes a search system 120. Search system 120 is configured to provide sponsored search results and non-sponsored search results, i.e., advertisements, for a received search query 112. As shown in FIG. 1, search system 120 includes a search engine 106 and an advertisement selector 116. These and further elements of network 100 are described as follows.

As shown in FIG. 1, one or more computers 104, such as first, second and third computers 104a-104c, are connected to a communication network 105. Network 105 may be any type of communication network, such as a local area network (LAN), a wide area network (WAN), or a combination of communication networks. In embodiments, network 105 may include the Internet and/or an intranet. Computers 104 can retrieve documents from entities over network 105. Computers 104 may each be any type of suitable electronic device, typically having a display and having web browsing capability, such as a desktop computer (e.g., a personal computer, etc.), a mobile computing device (e.g., a personal digital assistant (PDA), a laptop computer, a notebook computer, a tablet computer (e.g., an Apple iPad™), a netbook, etc.), a mobile phone (e.g., a cell phone, a smart phone, etc.), or a mobile email device. In embodiments where network 105 includes the Internet, numerous documents (including a document 103) that form a portion of World Wide Web 102, are available for retrieval by computers 104 through network 105. On the Internet, documents may be identified/located by a uniform resource locator (URL), such as http://www.documents.com/documentX, and/or by other mechanisms. Computers 104 can access document 103 through network 105 by supplying a URL corresponding to document 103 to a document server (not shown in FIG. 1).

As shown in FIG. 1, search engine 106 is coupled to network 105. Search engine 106 accesses a stored index 114 that indexes documents, such as documents of World Wide Web 102. A user of computer 104a who desires to retrieve one or more documents relevant to a particular topic, but does not know the identifier/location of such a document, may submit a query 112 to search engine 106 through network 105. For instance, the user may enter query 112 into a search engine entry box displayed by computer 104a (e.g., by a web browser). Search engine 106 receives query 112, and analyzes index 114 to find documents relevant to query 112. For example, search engine 106 may determine a set of documents indexed by index 114 that include terms of query 112. The set of documents may include any number of documents, including tens, hundreds, thousands, or even millions of documents. Search engine 106 may use a ranking or relevance function to rank documents of the retrieved set of documents in an order of relevance to the user. Documents of the set determined to most likely be relevant may be provided at the top of a list of the returned documents in an attempt to avoid the user having to parse through the entire set of documents.

Search engine 106 may be implemented in hardware, software, firmware, or any combination thereof. For example, search engine 106 may include software/firmware that executes in one or more processors of one or more computer systems, such as one or more servers. Examples of search engine 106 that may be accessible through network 105 include, but are not limited to, Yahoo! Search™ (at http://www.yahoo.com), Microsoft Bing™ (at www.bing.com), Ask.com™ (at http://www.ask.com), and Google™ (at http://www.google.com).

Figure 2:
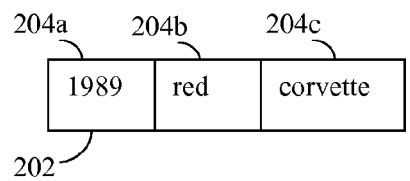
FIG. 2 shows an example query that may be submitted by a user to a search engine.

FIG. 2 shows an example search query 202 that may be submitted by a user of one of computers 104a-104c of FIG. 1 to search engine 106. Query 202 is an example of query 112, and includes one or more terms or features 204, such as first, second, and third features 204a-204c shown in FIG. 2. Any number of features 204 may be present in a query. As shown in FIG. 2, features 204a-204c of query 112 are "1989," "red," and "corvette." Search engine 106 applies these features 204a-204c to index 114 to retrieve a document locator, such as a URL, for one or more indexed documents that match 1989," "red," and "corvette," and may order the list of documents according to a ranking. The list of documents may be displayed to the user in response to query 202.

Furthermore, in a sponsored search environment, one or more advertisements may be selected for display to the user along with the documents displayed to the user in response to features derived from query 112. "Sponsored search" refers to a form of Internet advertising/marketing that enables advertisers to increase their visibility in the results page of a search engine query. In sponsored search, an advertiser may pay or provide other consideration for having information, such as a link to a website of the advertiser, appear in a sponsored section of the results webpage for one or more particular queries. The sponsored section is prominently displayed in the results page, to enable the user to easily view and interact with the displayed information of the advertiser. In this manner, an advertiser is enabled to provide advertisements to users that are directly related to their queries, and a search engine owner/operator is enabled to further monetize the search engine.

For example, network 100 may include advertisement selector 116 that is configured to select advertisements related to received queries for display. Advertisement selector 116 may receive query 112 from search engine 106. Advertisement selector 116 may include a mapping of queries to advertisers/advertisements. Advertisement selector 116 may determine from the mapping whether advertisements are present that correspond to query 112, and if so, to select one or more of the corresponding advertisements to be displayed as sponsored search results for query 112. Advertisement selector 116 may provide an indication of the selected advertisements to search engine 106. Search engine 106 may generate a search results page 118 that is transmitted to first computer 104a to be displayed (e.g., by a browser), and that includes any determined search results and selected advertisements for query 112.

III. Example Embodiments of Contextual Interpretation of User Queries Using Session-Based Query Processing Existing search techniques interpret queries submitted to a search engine individually rather than cumulatively in the context in which they are generated by users. Successive queries by a user may use different words in search of related information to accomplish the same or related tasks. In each successive query, terms may be omitted and others may be substituted, resulting in inconsistent sets of features. Feature information, such as geo features, may not be similarly or sufficiently expressed in every query. As a result of individual interpretation where features are not carried between queries, successive queries in a query session may be interpreted and treated differently by search algorithms (business rules), resulting in reduced accuracy of sponsored and non-sponsored search results.

Applying contextual or cumulative interpretation to user queries recognizes and seeks to benefit from the fact that users often generate a series of searches in a given time interval on a particular topic and/or with a particular goal. Contextual interpretation observes and exploits correlations between successive queries in the same session. As a result, contextual interpretation improves the accuracy of sponsored and non-sponsored search results.

Various approaches are described herein for, among other things, improving the accuracy of sponsored and/or non-sponsored search results by contextual interpretation of user queries. Rather than interpreting queries based on only present features derived from the user query, queries are interpreted based on present features derived from the user query in the context of past features derived from qualified queries such as those received during a user query session. Based on contextual interpretation, present features may be augmented using past features. A search in response to the query is performed using the augmented features rather than the present features.

Contextual interpretation of queries improves search system understanding of the context in which queries are submitted, which is particularly helpful when interpolating query intent to develop features not expressed in a present query.

Contextual interpretation permits queries to be interpreted and treated more uniformly and more intelligently. As a result, users and advertisers may receive the benefit of more precise sponsored and/or non-sponsored search results.

Contextual interpretation of user queries is described in terms of the specific example of improving geo-precision of sponsored search results, but contextual interpretation of user queries applies more generally to query features and search results. Sessions may be general or specific to one or more features such as a geo feature. Contextual or cumulative interpretation may be applied to any individual query to clarify one or more query features that may be ambiguous.

Figure 3:
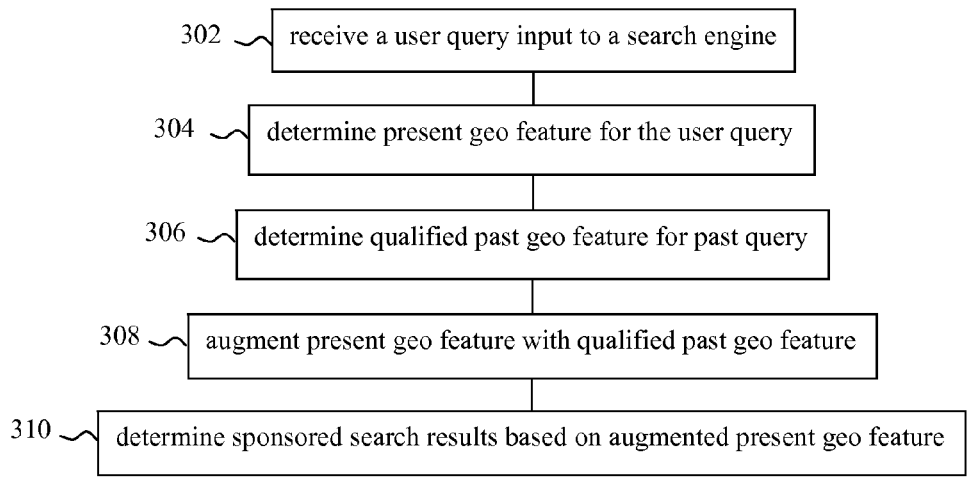
FIG. 3 shows a flowchart for generating one or more augmented query features from a received query, according to an example embodiment.

In one method implementation of contextual interpretation, e.g., method 300 shown in FIG. 3, a search query input to a search system, e.g., search system 120, is received 302. The user query is analyzed by search system 120 to determine 304 a present geo feature for the user query and to determine 306 a qualified past geo feature for a qualified past user query. The present geo feature is augmented 308 with the qualified past geo feature. A search result is determined 310 by search system 120 for the augmented present geo feature instead of the present geo feature.

Past geo features are qualified, for example, by determining that present and past queries were received during the same user query session. A session may be general in nature or may be based on a specific type of feature, such as a geo session based on geo context of queries. The existence of a session may be determined by time and/or query context. Query context may be based, for example, on query pattern recognition. For example, query context may be determined by matching a query topic by matching topic features (topic context) between queries and/or by matching query geography (geo context) by matching geo features between queries. Features may also be qualified based on other factors, such as a qualifying time interval between receipt of past and present queries.

Embodiments may use query information collected during one or more sessions as contextual information. A session may be based on a time interval. A session may be based on time and other factors. A session may be based on one or more features, such as a geo feature. For example, in some implementations, expression of a new geo feature may establish a new session. In other implementations, a session may be based on other features such as topic features. For example, queries pertaining to televisions may be cached in one session while queries pertaining to a ski trip may be cached in another session, recognizing that users may be submitting multiple queries is multiple browser windows. Query pattern recognition may be used to identify which session to assign queries to. A user may be engaged in one or more sessions at a time. Thus, use of sessions to store a context for contextual or cumulative interpretation of individual queries may vary from one embodiment to another.

Contextual interpretation of search queries, such as method 300, may be selectively applied. For example, in some embodiments, contextual interpretation method 300 may be applied to queries that fail to express geo intent, but not applied to queries that do express geo intent. In other embodiments, contextual interpretation of search queries, such as method 300, may always be applied even when a user expresses a geo intent in a query.

Augmenting 308 present query features may comprise adding features, removing features, emphasizing features, e.g., by weighting, and any other conceivable augmentation of present features. To appropriately emphasize particular features based on the context in which they are presented, present and past features may be weighted before merging them together. Weights may be adjusted based on numerous factors such as whether a feature is expressed or implied or based on a time interval between present and past queries on which a past feature is based. Features may be eliminated, for example, based on a failure to meet time and/or weight thresholds or based on duplication of features. For example, there may be a maximum time interval between a present and past query to permit the past query features to be used to augment present query features. As another example, there may be a minimum weight for a past query feature to be used to augment a present query feature. Such weight and time thresholds may be applied, for example, during a feature determination step or a feature merging step. Elimination of duplicate features may necessitate reweighting of features whose duplicates were eliminated.

Present features determined 304 may comprise features expressed in the query received 302 or may comprise features implied from the query such as a geo feature derived from a user's IP address or a user's registration information.

Past features determined 306, such as those derived for queries received during a user query session, may be maintained in a data structure. Such a data structure may store, for example, a session identifier, one or more geo features for a particular query and a query timestamp. The data structure may be updated with new entries for each new user query. Entries in the data structure may be removed, for example based on elapsed time and/or other factors, during a garbage collection process.

Augmented 308 features can be used to determine sponsored and/or non-sponsored search results. In some embodiments, sponsored and non-sponsored search results may be based on different query features, e.g., where non-sponsored results are determined by features derived only from a present query while sponsored results are determined 310 by advertisement selector 116 using augmented features.

Method 300, and other embodiments of contextual interpretation of queries, may be implemented in a search system, e.g., search system 120, having a session based query processing module or other component that interprets individual queries in the context in which they are submitted during a user query session. An exemplary session based query processing module is provided in FIG. 4A.

Figure 4A:
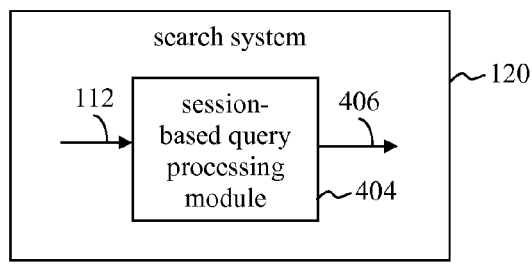
FIG. 4A shows a block diagram of a search system, according to an example embodiment.

FIG. 4A shows a block diagram of a search system, e.g., search system 120 of FIG. 1, according to an example embodiment. Search system 120 may include a search engine (e.g., search engine 106) and an advertisement selector (e.g., advertisement selector 116). Further, as shown in FIG. 4A, search system 120 includes a session-based query processing module 404. Session-based query processing module 404 may be implemented in one or both search engine 106, advertising selector 116 or anywhere else in search system 120.

Session-based query processing module 404 is configured to process received queries, e.g., query 112, to generate at least one query feature 406 in accordance with method 300 or other embodiments. Query feature 406 may comprise one or more present features of query 112 augmented by one or more qualified past features of one or more past queries received during a user query session. Query feature(s) 406 may be used by search engine 106 or advertisement selector 116 to search for and improve the accuracy of sponsored and/or non-sponsored search results for query 112, especially if it fails to express a feature, such as a geo feature, evident in other queries.

For instance, if, in a user query session, a user submits numerous past queries directed at a particular geographic location and then submits a contextually related present query without the geographic location, then contextual interpretation may be applied to the present query by session-based query processing module 404. Session-based query processing module would augment a geo feature of the present query, such as a geo feature implied based on IP address and/or registration information, by adding the geo feature expressed in numerous past queries in the session. A search would be performed on the augmented present geo feature instead of the present geo feature.

Figure 4B:
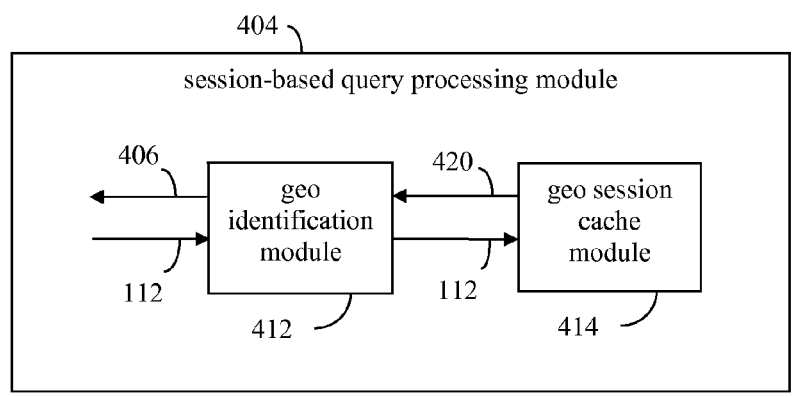
FIG. 4B shows a block diagram of a session-based query processing module, according to an example embodiment.

FIG. 4B shows a block diagram of session-based query processing module 404, according to an example embodiment. In this implementation, session based query processing module includes a geo identification module 412 and a geo session cache module 414, which, as indicated, pertain to the identification and caching of geo features. Other embodiments of session-based query processing module 404 may pertain to other features or a plurality of features.

Geo identification module 412 identifies geo features in queries while geo session cache module 414 is configured to store past geo features for past queries. In some embodiments, other modules such as a sponsored search front end, ad selection front end and/or the back end of either component may implement aspects of session-based query processing of user queries.

In the embodiment illustrated in FIG. 4B, geo identification module 412 receives user query 112 and provides part or all of query 112 to geo session cache module 414. In some embodiments, query 112 may first be received by another component of search system 120, which may, for example, process query 112 to associate it with a session identifier and timestamp indicating the time query 112 was received. Irrespective whether query 112 is processed before being provided to geo identification module 412, geo identification module 412 identifies geo features expressed in and/or implied for query 112, which is referred to as the present query.

Geo features may be determined from multiple sources. A primary source for geo features is an expression of geo-intent in a user query. For example, if a user enters queries such as "Lake Tahoe Ski Resorts" or "Lake Tahoe Weather," then the geo feature in each query is explicit, i.e., "Lake Tahoe." Secondary sources of geo features are determined, for example, by mapping the IP address of the computer providing query 112 to a location and by using the location of an address a registered user provided to a search engine. Secondary sources may be default indicators of intent when users fail to indicate intent otherwise in their queries. Geo features determined by geo feature identification module 412 may include one or more primary geo features, one or more secondary geo features or a combination thereof.

Priority may be given to primary sources of geo features over secondary sources to emphasize expressed intent over implied intent. One way to implement priority is to weight a plurality of features, e.g., geo features, assigning a higher weight to a feature derived from a primary source and assigning a lower weight to a feature derived from a secondary source. These primary and secondary sources may be augmented by features from a contextual source, such as a session-based source, to increase the likelihood that search features determined based on queries accurately reflect user intent, e.g., geo intent, especially when a user fails to clearly express intent in an individual query. Similar to primary and secondary sources, contextual or session-based sources of features may be weighted to emphasize features deemed more likely to reflect user intent in query 112.

Geo session cache module 414 may be used to maintain a context for queries by maintaining information about queries received from a user during particular query sessions. A session may be based on time and/or other parameters. Users may, over a similar time period, submit queries to accomplish different tasks. In some embodiments, different tasks may be recognized and stored as different sessions in geo session cache module 414. Alternatively, different tasks may be stored in the same session, but may be differentiated by other information indicating differences in query terms, features, etc. Geo session cache module 414 maintains information about queries received prior to present query 112 for access by geo identification module 412 and/or other components configured to interact with geo session cache module 414 and information maintained therein. In one embodiment, geo session cache module 414 may store information for each query such as a query session identifier, the query itself, features such as geo features, weights assigned to features and a query timestamp.

Geo session cache module 414 communicates 420 with geo identification module 412 after receiving information about query 112. In some embodiments, communication 420 may comprise raw data following a lookup of information pertaining to query 112, assuming that geo identification module 412 or other component(s) in search system 120 processes the raw data. In other embodiments, communication 420 may comprise a result of processing data stored in cache such as past features weighted relative to present features weighted by geo identification module 412. As illustrated by different embodiments in FIGS. 4B, 16 and 18, architecture, interconnectivity and functionality of components such as geo identification module 412 and geo session cache module 414 may vary among embodiments providing contextual interpretation of queries. In the particular embodiment shown in FIG. 4B, geo identification module 412 interacts directly with geo session cache module 414 to receive past features via communication 420. In some embodiments, geo identification module 412 may process the past features to augment present geo features and then provide augmented geo features via communication 406. In other embodiments, geo identification module 412 may forward past and present features to another component via communication 406 to augment present geo features with past geo features. Irrespective which component implements which portion of necessary logic, augmented present query features, e.g., augmented geo features, may be used by advertisement selector 116 and/or search engine 106 to search for and improve the accuracy of sponsored and/or non-sponsored search results for query 112.

For example, assume a user is planning a ski trip to Lake Tahoe, which represents the user's overall goal. To accomplish this goal, the user issues a set of queries looking for hotels, checking weather, finding ski rental businesses, checking ski reports, etc. as these tasks or sub goals come to mind Assume the user enters "Lake Tahoe hotels" in a first query, "Lake Tahoe Weather" in a second query, "Ski rentals" in a third query, "Ski resorts" in a fourth query and "Ski reports" in a fifth query. If these queries are interpreted individually instead of cumulatively or in the context in which they are submitted, search results would display sponsored search results, i.e., advertisements, specific to Lake Tahoe for the first two queries, but not the last three queries because the user fails to express a geo intent in the last three queries. Advertisements displayed in sponsored search results for the last three queries would be based on secondary geo features derived from the IP address of the computer the user used to submit the queries or, if the user is registered with the search provider, derived from user registration information. The disparate interpretation and treatment of the user's series of queries reduces the quality of the session for both the user and advertisers, who may have finite ad inventories they do not wish to see over or under utilized. Session quality can be substantially improved by contextual or cumulative interpretation of each query using cached information about previous queries submitted during the query session. In the foregoing example, geo precision of the last three queries can be improved by augmenting geo features of the last three queries with the expressed geo feature "Lake Tahoe" in the first two queries. Geo precision is defined as the number of highly relevant geo-targeted advertisements divided by the total number of advertisements shown to a user. As a result of interpreting each query cumulatively or in the context in which it is submitted, search results would display sponsored search results, i.e., advertisements, specific to Lake Tahoe for all five queries. Similarly, the accuracy of non-sponsored search results could be improved by searching for non-sponsored index using the augmented present geo features instead of present geo features.

In another example, assume a user is planning a vacation to Las Vegas, which represents the user's overall goal. To accomplish this goal, the user issues a set of queries to book flights, hotels, car rentals, find restaurants, etc. as these tasks or sub goals come to mind Assume the user enters "cheap flights to Las Vegas" in a first query, "Las Vegas hotels" in a second query, "car rentals" in a third query and "restaurants in strip" in a fourth query. If these queries are interpreted individually instead of cumulatively or in the context in which they are submitted, search results would display sponsored search results, i.e., advertisements, specific to Las Vegas for the first two queries, but not the last two queries because the user fails to express a clear geo intent in the last three queries. No geo intent is expressed in the third query and geo intent of "strip" may not be correlated only to Las Vegas. Advertisements displayed in sponsored search results for the last two queries would be based on secondary geo features derived from the IP address of the computer the user used to submit the queries or, if the user is registered with the search provider, derived from user registration information. The disparate interpretation and treatment of the user's series of queries reduces the quality of the session for both the user and advertisers, who may have finite ad inventories they do not wish to see over or under utilized. Session quality can be substantially improved by contextual or cumulative interpretation of each query using cached information about previous queries submitted during the query session. In the foregoing example, geo precision of the last two queries can be improved by augmenting geo features of the last two queries with the expressed geo feature "Las Vegas" in the first two queries. As a result of interpreting each query cumulatively or in the context in which it is submitted, search results would display sponsored search results, i.e., advertisements, specific to Las Vegas for all four queries. Similarly, the accuracy of non-sponsored search results could be improved by searching for non-sponsored index using the augmented present geo features instead of present geo features.

Figures 5, 6:
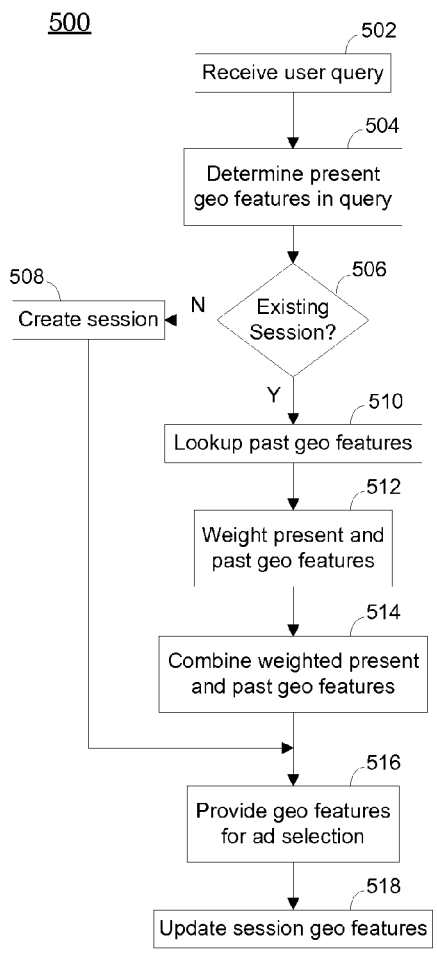
FIG. 5 shows a flowchart for generating one or more augmented query features from a received query, according to an example embodiment.
FIG. 6 shows a data structure of a query session cache module, according to an example embodiment.

FIGS. 5 and 6 provide additional detailed embodiments of search system 120 and components therein such as session-based query processing module 404. Specifically, FIG. 5 shows a flowchart for generating one or more augmented query features from a received query while FIG. 6 shows a data structure of a query session cache module, according to example embodiments. FIG. 5 is described with reference to the data structure shown in FIG. 6.

FIG. 6 illustrates one embodiment of a data structure stored in geo session cache module 414. In this embodiment, cache 600 stores information about geo features. However, in other embodiments, cache 600 may store information about features other than geo features and may store information about a plurality of different features. In this embodiment, cache 600 stores a single query session with a user. However, in other embodiments, cache 600 may store a plurality of query sessions for one or many users. In this embodiment, cache 600 stores four types of data, i.e., session ID 602, user query 604, past geo features and associated timestamp 606 and query timestamp 608. However, in other embodiments, cache 600 may store more or fewer types of data. In this embodiment, cache 600 stores only express geo features, i.e., geo features explicitly proved in queries. However, in other embodiments, cache 600 also stores implied features or features derived from information other than queries such as IP addresses and registration information.

In the embodiment shown in FIG. 6, cache 600 stores one entry per query, e.g., entries 610-618 for each of five queries in the same session. First entry 610 stores information about the first query, "lake tahoe hotels," which occurred (e.g., was submitted by a user) at time t1 as indicated by query timestamp 608. Since this is the first query in session S123789, the entry in past geo features 606 is "empty." In other words, there is no existing context with which to interpret the first query. In some embodiments query entry 610 would not necessarily be the first query a user submitted in session S123789. In some embodiments, a garbage collection process, for example within a cache updating process, would eliminate older cache entries, which would change the first entry over time.

Second entry 612 stores information about the second query, "lake tahoe weather," which occurred at time t2. Past geo features 606 entry for the second query indicates that the geo feature and timestamp for the past, i.e., first query are, respectively, "lake tahoe" at time t1. This entry represents, for example, a past geo feature provided by geo session cache module 414 to geo identification module 412 in response to receiving second query "lake tahoe weather" as query 112 for session ID S123789.

Third entry 614 stores information about the third query, "reno resorts," which occurred at time t3. Past geo features 606 entry for the third query indicates that the geo features and timestamps for the first and second queries are, respectively, "lake tahoe" at time t1 and again at time t2. This entry represents, for example, past geo features provided by geo session cache module 414 to geo identification module 412 in response to receiving third query "reno resorts" as query 112 for session ID S123789.

Fourth entry 616 stores information about the fourth query, "ski rentals," which occurred at time t4. Past geo features 606 entry for the fourth query indicates that the geo features and timestamps for the first, second and third queries are, respectively, "lake tahoe" at times t1 and t2 and "reno" at time t3. This entry represents, for example, past geo features provided by geo session cache module 414 to geo identification module 412 in response to receiving fourth query "ski rentals" as query 112 for session ID S123789.

Fifth entry 618 stores information about the fifth query, "ski reports," which occurred at time t5. Past geo features 606 entry for the fifth query indicates that the geo features and timestamps for the first, second, third and fourth queries are, respectively, "lake tahoe" at times t1 and t2, "reno" at time t3. This entry represents, for example, past geo features provided by geo session cache module 414 to geo identification module 412 in response to receiving fifth query "ski reports" as query 112 for session ID S123789.

Contextual interpretation of queries may be implemented in a wide variety of algorithms. One such algorithm is described with reference to FIG. 5. The following definitions describe the terms used in the algorithm.

S: particular user query session.

SId: unique identifier that defines a particular session S for a given user.

q(t): query q from a user at time t during session S.

Q(S): set of past queries (query context) received from a user during session S before q(t). It may be null for the first query in a session.

g(i): present geo feature generated from query q(t).

ag(i): past geo feature (geo context) generated from the set of past queries Q(S).

G(q): list of present geo features {g1, g2, ... gn} generated from query q(t).

AG(Q): list of past geo features {ag1, ag2, ... agm} generated from Q(S). If Q(S) is null, AG(Q) is null.

CG(q, Q): list of combined present and past geo features from G(q) and AG(Q).

Wt(g): weight of geo feature g(i) generated from query q(t).

AWt(ag): weight of geo feature ag(i) generated from set of past queries Q(S).

CWt(g,ag): combined set of weights corresponding to CG(Q,q) feature set.

Wthres: weight threshold qualifying past geo feature for augmentation.

Tspan: time interval threshold disqualifying past queries from augmentation.

Referring now to FIG. 5, flowchart 500 begins with step 502. In step 502, a user query q(t) input to a search engine at time t is received. For example, as shown in FIG. 4B, geo identification module 412 receives query, i.e., query q(t), 112. Using the exemplary queries illustrated in FIG. 6, query q(t) 112 could be any one of the five queries listed under user query 604.

In step 504, present geo features g(i) forming list of features G(q) are determined based on query q(t) 112. For example, as illustrated in FIG. 4B, geo identification module 412 determines present geo features g(i) from query q(t) 112. If query q(t) 112 is the first query, "lake tahoe hotels," in FIG. 6, the express present geo feature g1 determined would be "lake tahoe." Additional present geo features {g2 ... gn} may be derived, for example, from an IP address of the computer used by user, e.g., computer 104a, and/or any user registration information the user provided to the search provider.

Although not shown in FIG. 5, in some embodiments, present features g(i) may be assigned weights Wt(g), e.g., to assign relative confidence in express and/or implied present features g(i), even when query q(t) 112 is the first in a session and there are no past features ag(i) derived from past queries Q(S) to augment present features g(i).

In step 506, a decision must be made whether query q(t) 112 is a query in an existing session or whether it is the first query in a new session. As illustrated in FIG. 6, the first query, "lake tahoe hotels," is the first query q(t1) in a new session S123789. Thus, at least for the first query q(t1) in FIG. 6, decision 506 would be answered in the negative. In step 508, a new session S123789 is created. In some embodiments, query q(t) 112 may be provided to session based query processing module 404 with a session ID assigned upon receipt of query 112 by search system 120. Thus, assignment and/or recognition of a new session may occur in another component of search system 120. In such embodiments, the session ID may still be looked up in geo session cache module 412 to determine whether a query q(t) is received in the context of an existing session or whether it is a new session.

In step 516 following step 508, the set of geo features G(q) determined in step 504 are provided for selection of advertisements. For example, geo feature g(1) "lake tahoe," perhaps among other features such as "hotels," is provided via communication 406 to advertisement selector 116 to determine at least one sponsored search result to provide to a user in response to the first query q(t1), "lake tahoe hotels."

In step 518, session geo features are updated, for example, in cache 600 within geo session cache module 414. For example, updating geo features after receiving the first query in a session may comprise storing entry 610 under session ID S123789 in cache 600 within geo session cache module 414.

Although not shown in FIG. 5, sessions, as well as entries in sessions, may be deleted or overwritten after expiration of a time threshold Tspan. In one embodiment, a garbage collecting routine eliminates old entries, e.g., those with a timestamp exceeding a threshold time Tspan before present time described by the following garbage collection algorithm:

```
If (Current Time − Query Timestamp t[i]) > Tspan
    Then delete query
    If Query timestamp t[i] is final entry in session S
        Then delete session S
``` where Tspan may be a fixed or variable time measured, for example, in minutes, hours or days that may be influenced by the amount of cache available and/or the number of current users of search system 120. Garbage collection may serve several purposes. First, it may serve to keep session cache size in check and spread its availability to more users. Second, it may serve to avoid augmenting present user queries q(t) based on query history older than Tspan.

Returning to step 502 and beginning with another example query shown in cache 600, in step 502 the third query q(t3), "reno resorts," is received. In step 504, the present geo features G(Q) are determined, including "reno." This determination may be made, for example, by geo identification module 412. In step 506, the query q(t3) "reno resorts" is determined to be part of an existing session S123789. In step 510, past geo features AG(Q) in the existing session are looked up, for example, in cache 600. This lookup may be made, for example, by geo session cache module 414. In this case, the past geo features AG(Q) are ag1 and ag2 "lake tahoe" at times t1 and t2 for the first and second queries q(t1) and q(t2). Similar to the garbage collection process used to maintain cache 600, queries and their features may be time-barred by the algorithm used in step 510 to lookup past queries and features for augmentation. Time-barring past queries and features effectively assigns a zero weight to such past features. One such algorithm applying a time threshold in step 510 is as follows:

```
If (Current Time − query timestamp t[i]) < Tspan
    Then include query in lookup of past geo features
Else
    Do not include query in lookup of past geo features
``` where Tspan may be a fixed or variable time measured, for example, in minutes, hours or days that may be influenced by the amount of cache available and/or the number of current users of search system 120.

In steps 512, 514 and 516, present and past geo features G(Q) and AG(Q) are weighted and combined to augment present geo features. These steps may be implemented in part or in full by, for example, geo identification module 412. These steps may be implemented in a wide variety of algorithms. In general, in the particular case of the third query q(t3), in one embodiment first present geo feature g1 Reno may be given a higher weight Wt(g) because it was expressly identified instead of past geo features ag1, ag2 Lake Tahoe. However, Lake Tahoe may be given a significant weight Awt(ag) given that it was a geo feature expressed in two immediately previous searches and, moreover, the Reno-Lake Tahoe area shares an international airport effectively making these different geo features more similar than dissimilar.

Weighting algorithms may take many parameters and facts into account, such as time intervals between queries, number of times a feature is repeated, query subject matter, distance between geo features, feature type (e.g. geo feature), etc. In one embodiment, an algorithm may be used in step 512 to weight Wt(g) present geo features g(i) and subsequently reweight (adjust the weights of) these features based on elapsed time when using the features as context or past geo features ag(i). Original weights determined for present features and the time-adjusted weights of past geo features may be stored in each entry 610-618 in cache 600 for use in weighting past features in response to future queries. Thus, for each new or present query, a feature set and corresponding feature weights are determined for present features, i.e., G(q)={g1, g2 . . . gn} with corresponding weight set Wt(g)={wt1, wt2 . . . wtn}. Likewise, a feature set and corresponding feature weights are determined for past features of queries made within time threshold Tspan within the same session S, i.e., AG(Q)={ag1, ag2 . . . agm} with weight set AWt(ag)={awt1, awt2 . . . awtm}. Weight set AWt(ag), at least initially before time-based adjustment, may be the same weight set assigned to features for the previous query q(t-1) in session S. Past features may be merged so that only unique features are present in past feature set AG(Q) and, when duplicate elimination occurs, weight set AWt(ag) may be adjusted, e.g., to increase the weight of a feature having an eliminated duplicate feature. Past weight set AWt(ag) may also be adjusted using time as a parameter to define feature importance for past queries Q(S) relative to a present query q(t). For example, past feature weights awtm may be adjusted to use for contextual interpretation of a present query q(t) by the following algorithm:

```
For M = 1, 2...m
    adjusted awtm = awtm/[1+ alpha * log(current time - t[i])]
``` where alpha is a constant that may vary among embodiments and t[i] is the time of receipt of the query for which past feature agm was generated In other embodiments, previous weighting may be ignored. In one such embodiment, for each present query, qualifying present and past features may be weighted by the same algorithm based on whether they were expressed in a query or implied for a query, regardless of the query, and then the assigned weights may be adjusted by elapsed time to emphasize more recent queries and features. In this manner, a feature expressed in immediately preceding past query q(t-1) during session S may still be weighted higher (emphasized more) than a present feature implied for a present query q(t) with no expressed feature, e.g., geo feature.

In some embodiments, after adjusting weights based upon time value, weights for features may be compared with a global weight threshold Wthres in order to eliminate minimally relevant features, which may also reduce processing time. For example, in one such embodiment features are retained or eliminated by the following algorithm:

```
For M = 1, 2...m
    If (awtm > Wthres)
        Keep agm in past feature set AG(Q)
    Else
        Remove agm from past feature set AG(Q)
``` where minimum weight threshold Wthres may be fixed or variable and may vary from one embodiment to another.

In step 516, present feature set G(q) is augmented to form augmented feature set CG(q, Q) and accompanying augmented weight set CWt(g, ag) by merging or combining weighted present feature set G(q) with past features remaining in past feature set AG(Q) having weights determined by an embodiment of step 512. In some embodiments, duplicates of past and present features, e.g., "Lake Tahoe" in queries q(t1) and q(t2) may be eliminated and, when they are, weighting may be adjusted, i.e., CWt(g, ag)=merge weights of duplicates {Wt(g), AWt(ag)}. In one embodiment, this may be implemented by adding weights of duplicates together and assigning the summed weight to the feature whose duplicate was eliminated.

In step 516, augmented feature set CG(q, Q) and accompanying augmented weight set CWt(g, ag) are provided, e.g., in communication 406 from geo identification module 412, for use in sponsored search, which results in advertisement selection.

In step 518, session geo features are updated, for example, in cache 600 within geo session cache module 414. For example, updating geo features after receiving the first query in a session may comprise storing entry 614 under session ID S123789 in cache 600 within geo session cache module 414.

IV. Examples of Search Results and Selected Advertisements Based on Embodiments As described above, embodiments of contextual or cumulative interpretation of individual queries enable improved sponsored and/or non-sponsored search results compared to conventional techniques for isolated interpretation of individual queries. Examples of sponsored and non-sponsored search results are described as follows with respect to FIGS. 7-12, including search results (non-sponsored results) determined using only present geo features and advertisements (sponsored results) selected based on conventional techniques using only present geo features and selected based on augmented geo features according to embodiments. Such search results and selected advertisements are provided for purposes of illustration and are not intended to be limiting.

Figure 7:
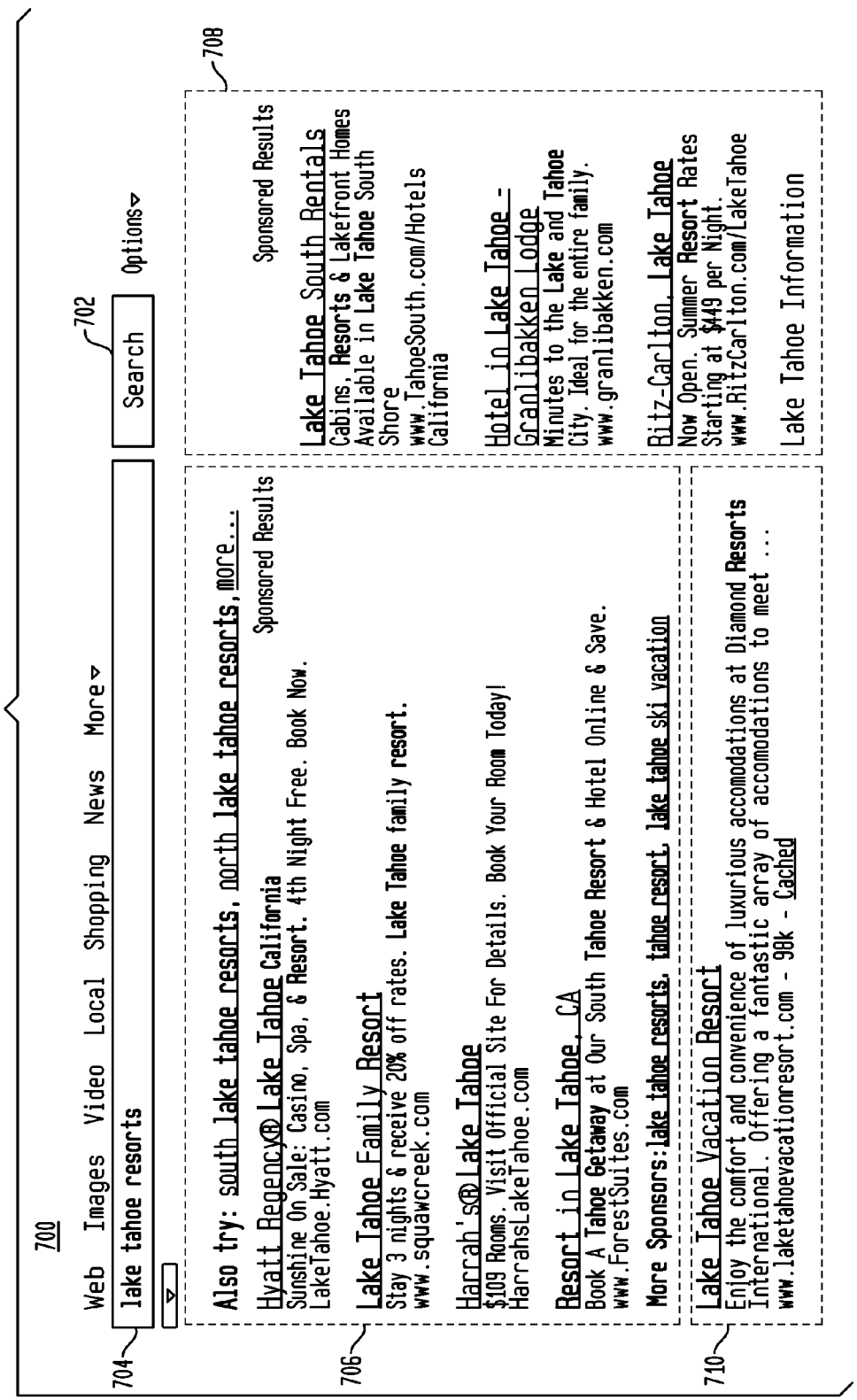
FIG. 7 shows a webpage displayed in response to the query "lake tahoe resorts" submitted to a search engine.
Figure 9:
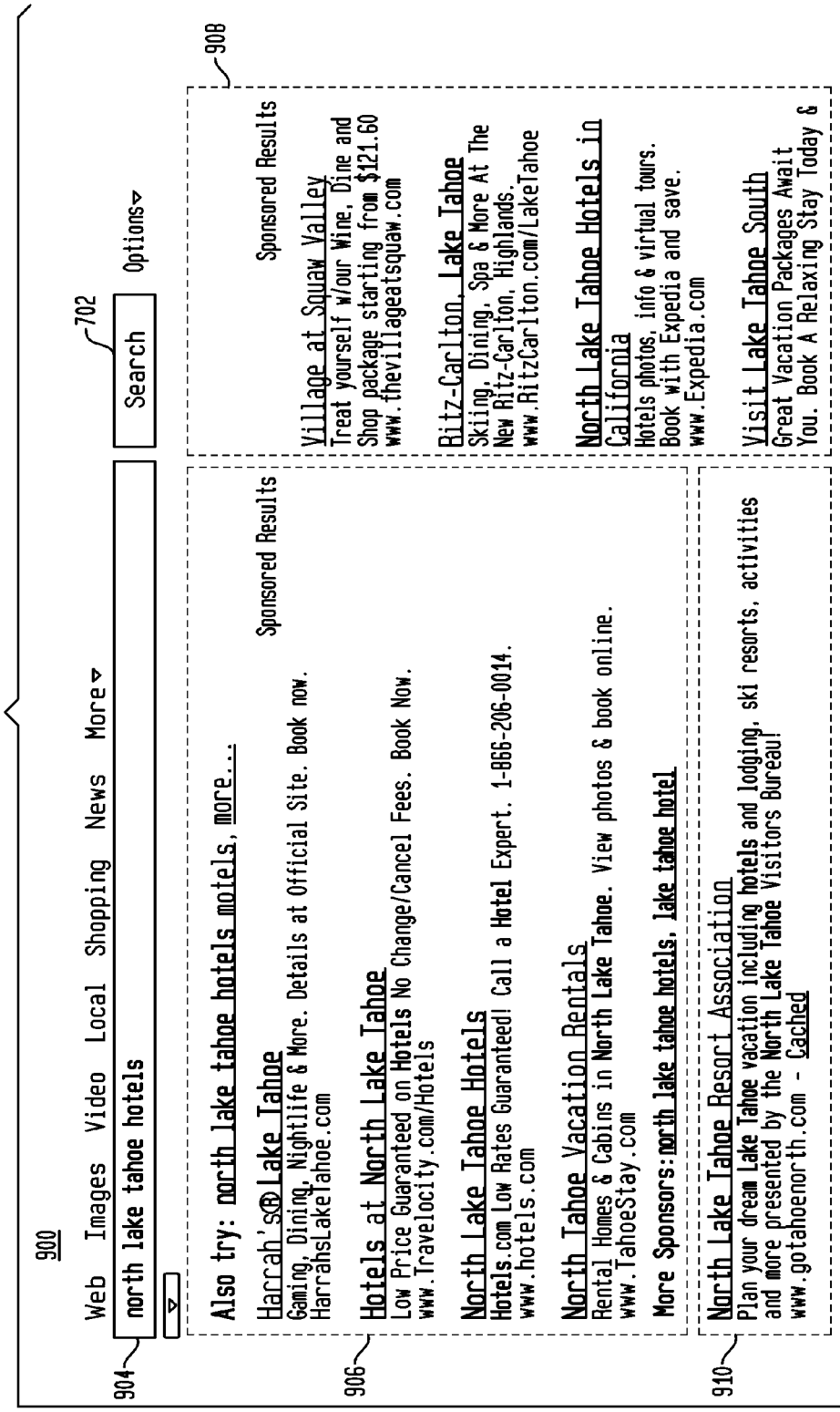
FIG. 9 shows a webpage displayed in response to the query "north lake tahoe hotels" submitted to a search engine.
Figure 10:
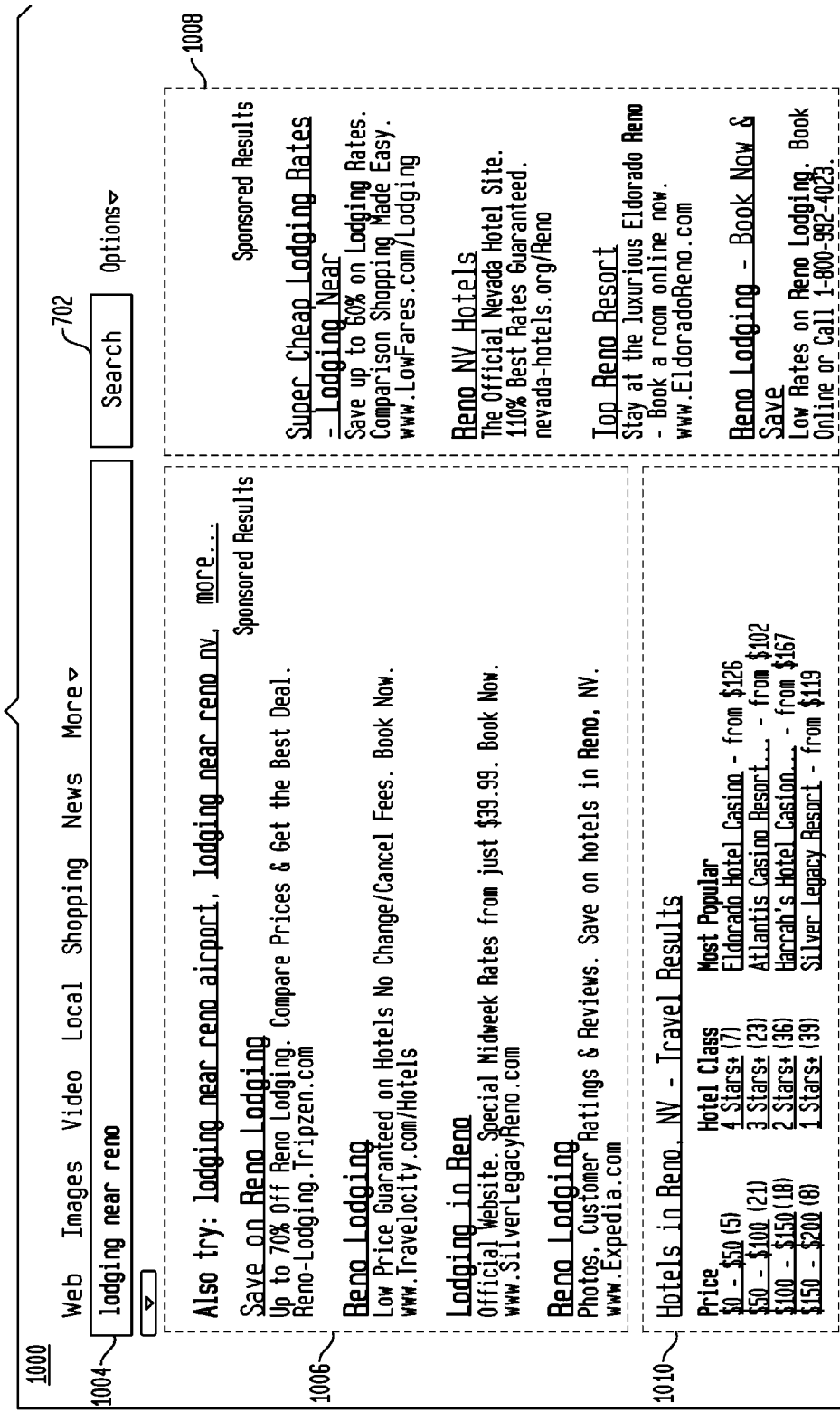
FIG. 10 shows a webpage displayed in response to the query "lodging near reno" submitted to a search engine.
Figure 11:
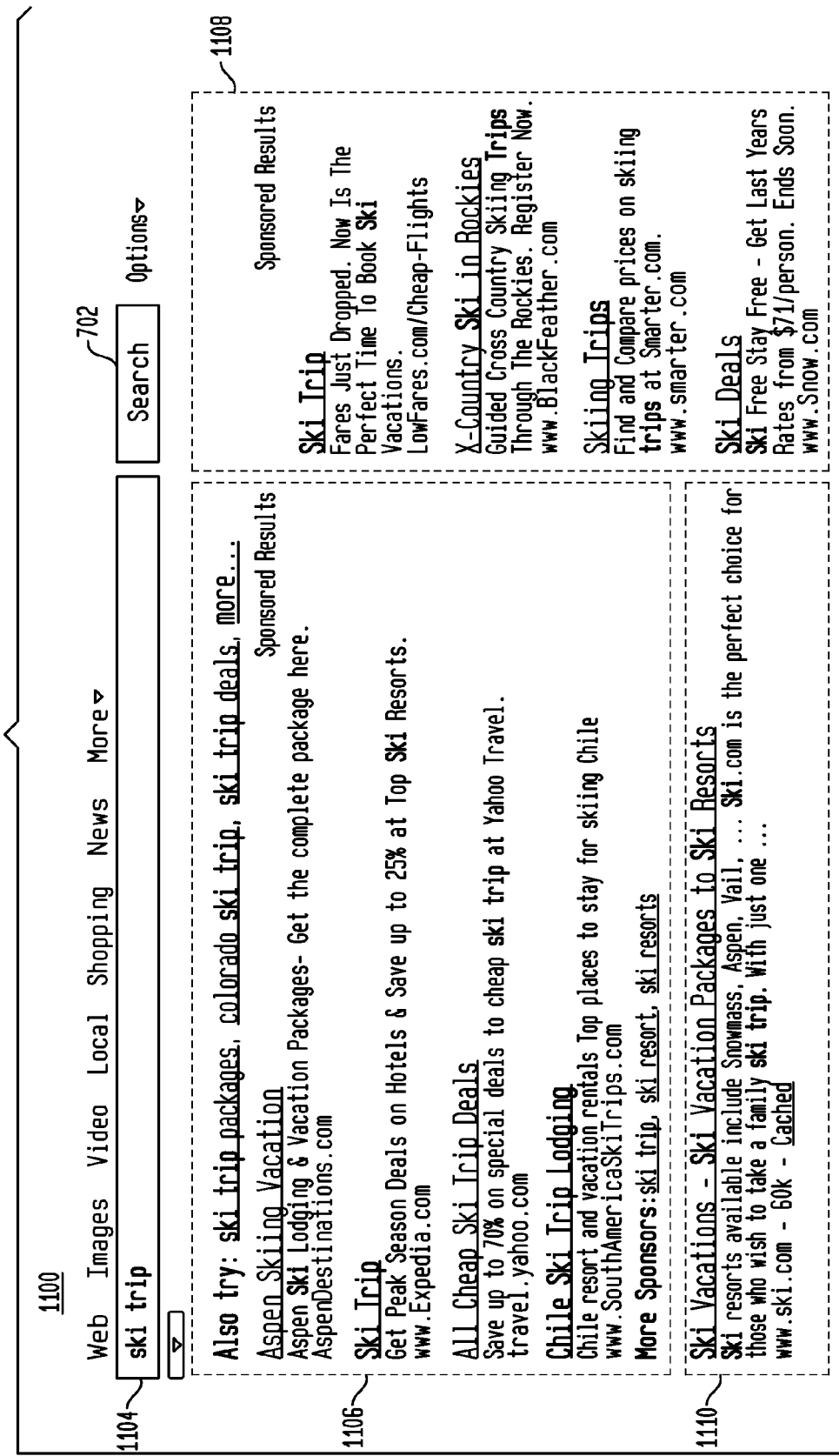
FIG. 11 shows a webpage displayed in response to the query "ski trip" submitted to a search engine.
Figure 12:
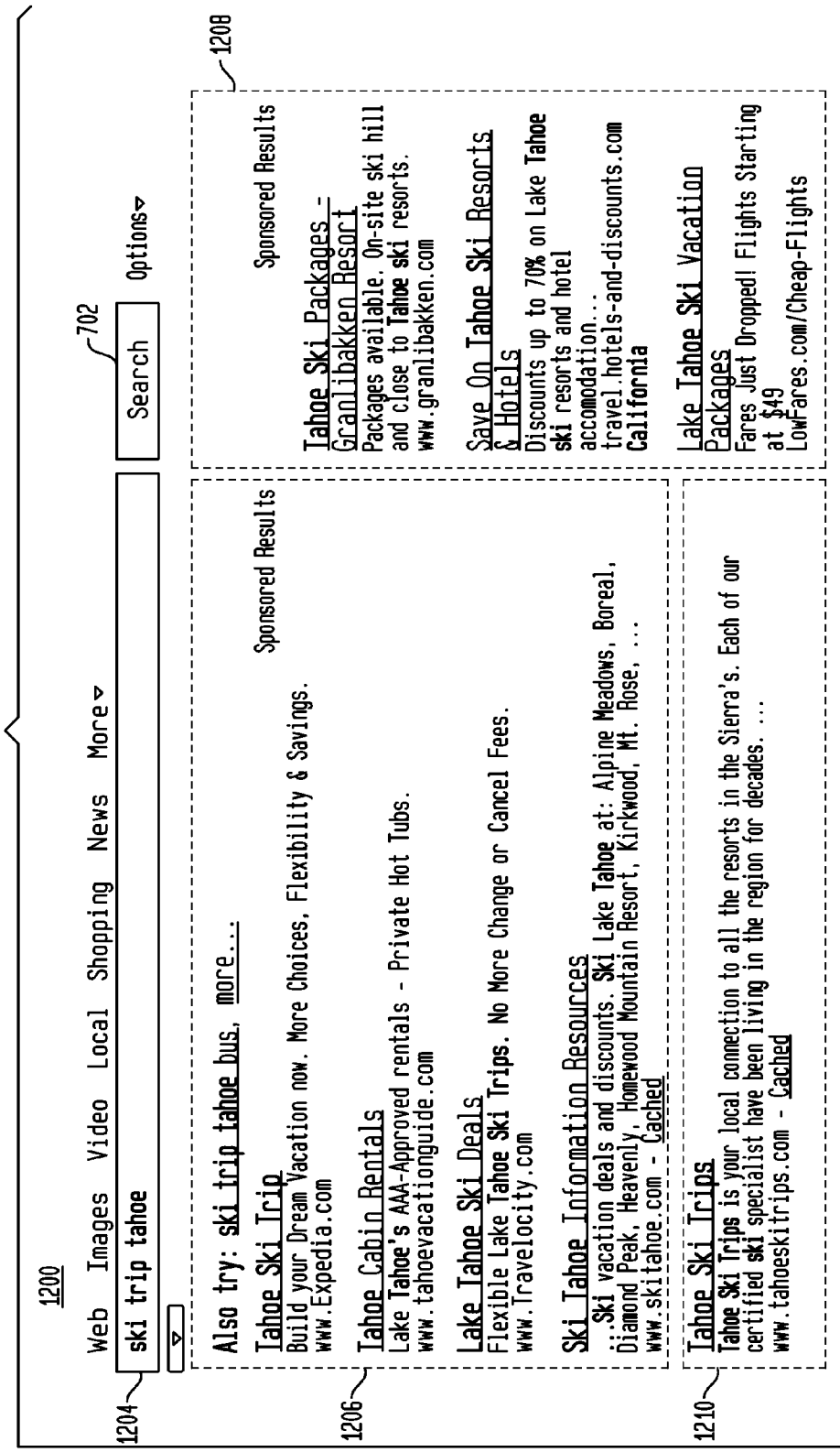
FIG. 12 shows a webpage displayed in response to the query "ski trip tahoe" submitted to a search engine.

Culminating in FIG. 12, FIGS. 7-12 illustrate an example of improved sponsored search results enabled by embodiments. In this exemplary session, the user indicates an overall goal of a ski trip to Lake Tahoe and issues queries to accomplish the task of finding lodging in the Lake Tahoe-Reno area. In this example, a user enters five successive queries in the session, the earliest of which is shown in FIG. 7 and the last of which is shown in FIG. 11. The difference between sponsored results in FIGS. 11 and 12 show the improvement made by implementation of an embodiment.

FIG. 7 shows a screen capture of webpage 700 displayed in response to a first query "lake tahoe resorts" 704 submitted to a search engine by entering the query "lake tahoe resorts" 704 in the search box and selecting search button 702, during a user query session. As shown in FIG. 7, the query "lake tahoe resorts" is processed by session-based query processing module 404 to generate the present geo feature of "lake tahoe." Search results (non-sponsored results) and selected advertisements (sponsored results) are generated in response to the query based on the topic feature of "resorts" and geo feature of "lake tahoe." Webpage 700 is generated by a search system, such as search system 120. Webpage 700 displays a first sponsored advertisements results region 706, a second sponsored advertisements results region 708 and a search results region 710. Note that the layout of webpage 700 shown in FIG. 7 (and of the further webpages shown in FIGS. 8-12) is an example layout of a web page user interface for interacting with search engine 106, and is not intended to be limiting. In other embodiments, webpages shown in FIGS. 7-12 may have other layouts.

Figure 8:
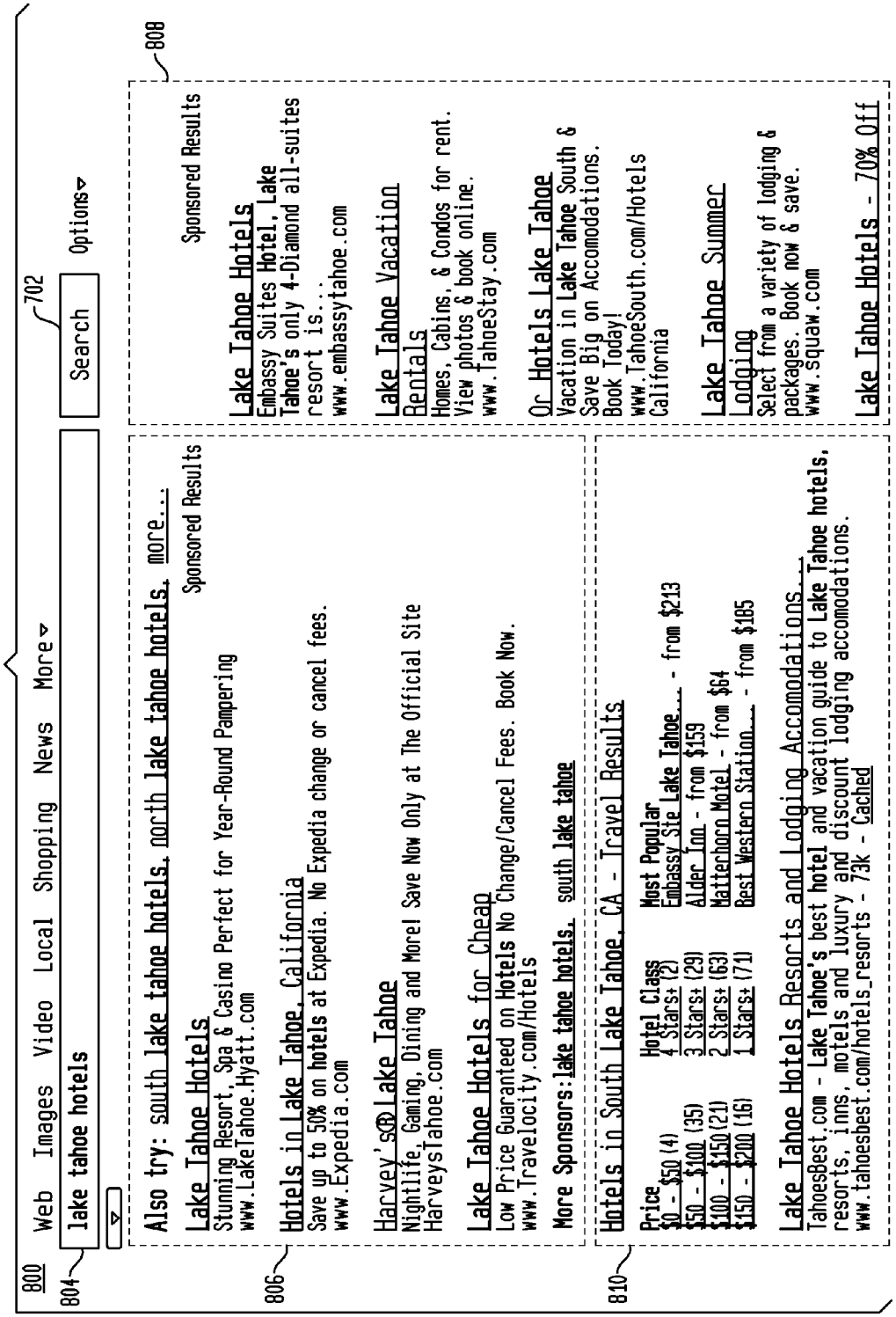
FIG. 8 shows a webpage displayed in response to the query "lake tahoe hotels" submitted to a search engine.

FIG. 8 shows a screen capture of a webpage 800 displayed in response to the second query "lake tahoe hotels" 804 submitted to a search engine during the user query session by entering the query "lake tahoe hotels" 804 in the search box and selecting search button 702, during a user query session. Webpage 800 is generated by a search system, such as search system 120. Webpage 800 displays a first sponsored advertisements results region 806, a second sponsored advertisements results region 808 and a search results region 810.

FIG. 9 shows a screen capture of a webpage 900 displayed in response to the query "north lake tahoe hotels" 904 submitted to a search engine by entering the query "north lake tahoe hotels" 904 in the search box and selecting search button 702, during a user query session. Webpage 900 is generated by a search system, such as search system 120. Webpage 900 displays a first sponsored advertisements results region 906, a second sponsored advertisements results region 908 and a search results region 910.

FIG. 10 shows a screen capture of a webpage 1000 displayed in response to the query "lodging near reno" 1004 submitted to a search engine by entering the query "lodging near reno" 1004 in the search box and selecting search button 702, during a user query session. Webpage 1000 is generated by a search system, such as search system 120. Webpage 1000 displays a first sponsored advertisements results region 1006, a second sponsored advertisements results region 1008 and a search results region 1010.

FIG. 11 shows a screen capture of a webpage 1100 displayed in response to the query "ski trip" 1104 submitted to a search engine by entering the query "ski trip" 1104 in the search box and selecting search button 702, during a user query session. Webpage 1100 is generated by a search system, such as search system 120. Webpage 1100 displays a first sponsored advertisements results region 1106, a second sponsored advertisements results region 1108 and a search results region 1110.

What FIG. 11 is designed to show is search results without an implementation of the invention for purposes of comparison to search results shown in FIG. 12. Search results displayed in FIG. 11 are based on isolated interpretation of query "ski trip" 1104 using one or more secondary or implied geo features derived from the IP address of the computer the user used to submit the queries or, if the user is registered with the search provider, derived from user registration information.

FIG. 12 shows a screen capture of a webpage 1200 displayed in response to the query "ski trip tahoe" 1204 submitted to a search engine by entering the query "north lake tahoe hotels" 1204 in the search box and selecting search button 702, during a user query session. Webpage 1200 is generated by a search system, such as search system 120. Webpage 1200 displays a first sponsored advertise-ments results region 1206, a second sponsored advertisements results region 1208 and a search results region 1210.

What FIG. 12 is designed to show by simulation is what one or more embodiments show in response to the fifth query "ski trip" illustrated in FIG. 11. The differences between sponsored and non-sponsored results in FIGS. 11 and 12, i.e., by comparing 1106 to 1206, 1108 to 1208 and 1110 to 1210, show the improvement made by implementation of an embodiment. Embodiments interpret the fifth query "ski trip" in the context of one or more qualifying features of the four previous queries having geo features "lake tahoe," "lake tahoe," "north lake tahoe" and "reno," the most prevalent geo feature being "tahoe" assuming the queries/features qualify for augmentation by meeting elapsed time and/or other qualification requirements. Session-based query processing algorithms (business rules) may be designed to give the highest priority (weight) to geo features expressed in queries over implied geo features and to increase the weight of geo features repeated in successive queries. Even with a weight reduction for passage of time, a repeated geo feature may still have a higher weight than implied present geo features. In one embodiment, present geo features implied from query "ski trip" would be augmented with past geo feature "tahoe," perhaps among other geo features, where geo feature "tahoe" may have the highest weight, i.e., emphasis, and result in the search results displayed in FIG. 12.

In other words, a search system implementing an embodiment, at least in this particular simulation, would show results of query "ski trip tahoe" to the user in response to the query "ski trip," which avoids forcing the user to manually enter the query "ski trip tahoe." This saves user time, search system time and improves the accuracy of search results to the benefit of users, advertisers and search system operators. Of course the exact results presented for any particular query session, including this one, depend on particular feature selection, weighting and augmenting algorithms as well as on sponsored and non-sponsored indexes and advertising inventories among many other variables. Thus, the example presented in FIGS. 7-12 is essentially one simulation at one particular point in time dependent upon a wide variety of prevailing conditions. Actual search results may vary from one embodiment to the next and from one point in time to the next.

The following section describes examples of search systems that may incorporate domain query processing embodiments.

V. Example System and Method Embodiments for Search Systems

In embodiments, session-based query processing module 404 of FIGS. 4A and 4B, as well as other contextual or cumulative interpretation components, may be included in part or in whole in a search engine or in an advertisement selector of search system 120, or may be separate from a search engine and advertisement selector in search system 120. FIGS. 13-16 present a few of many possible implementations.

Figure 13:
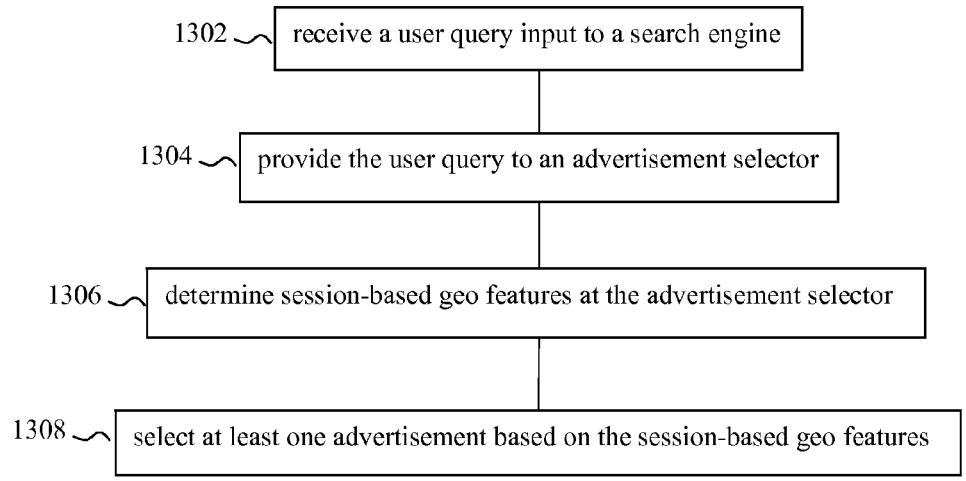
FIG. 13 shows a flowchart for session-based processing of a query at a search system, according to an example embodiment.

For instance, FIG. 13 shows a flowchart 1300 for session-based processing of a query at a search system, according to an example embodiment. In the example of flowchart 1300, the query is processed at an advertisement selector of a search system that includes a search engine and an advertisement selector. Flowchart 1300 begins with step 1302. In step 1302, the query is received at a search engine. In step 1304, the query is provided to an advertisement selector. In step 1306, at least one session-based query feature, e.g., geo feature, is determined at the advertisement selector. In step 1308, at least one advertisement is selected based on the at least one session-based query feature.

Figure 14:
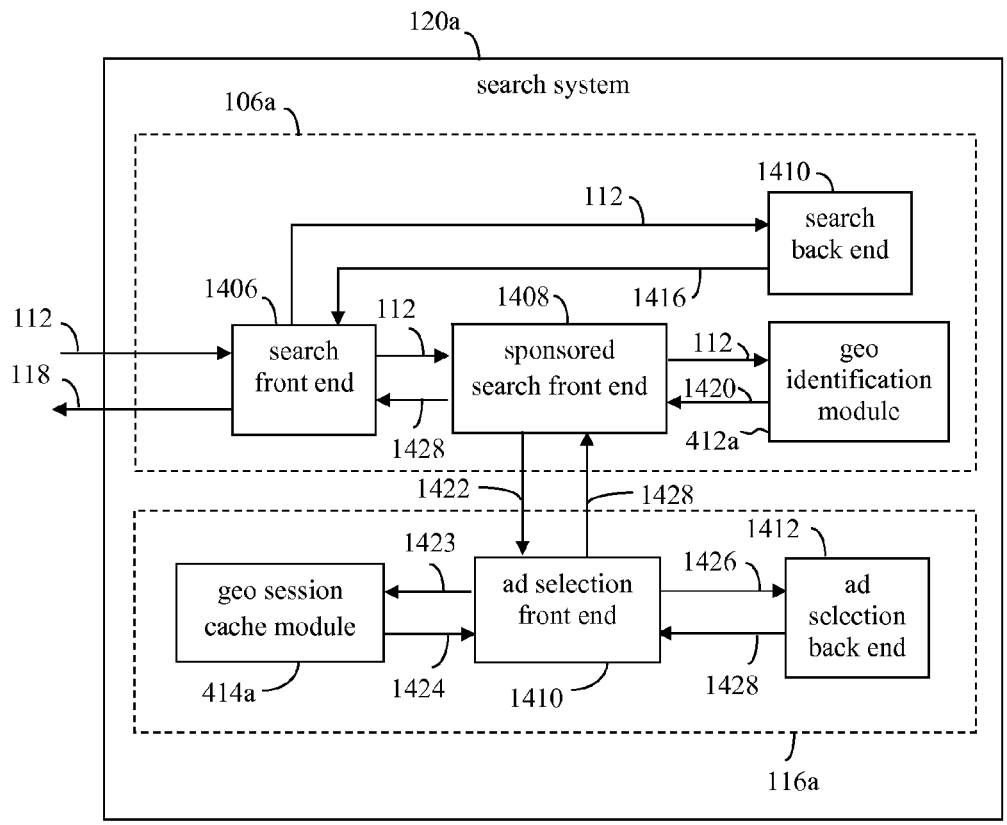
FIG. 14 shows a block diagram of a search system, according to an example embodiment.

Flowchart 1300 may be implemented by a variety of search systems. For instance, FIG. 14 shows a block diagram of a search system 120a, according to an example embodiment. Search system 120a may operate according to flowchart 1300 of FIG. 13. As shown in FIG. 14, search system 120a includes a search engine 106a and an advertisement selector 116a. Search engine 106a includes a search front end 1406, a sponsored search front end 1408, and a search back end 1410 and geo identification module 412a. Advertisement selector 116a includes an advertisement selection front end 1410, an advertisement selection back end 1412 and geo session cache module 414a. The elements of search system 120a are described as follows.

As shown in FIG. 14, search front end 1406 receives query 112. Search front end 1406 is an interface for search engine 106a for receiving queries from users. For instance, search front end 1406 may generate a search engine user interface (e.g., a web page displayable by a web browser) that provides a search engine entry box and search button 702 that enable users to input queries.

While not shown in the embodiment shown in FIG. 14, there may be communication between components in addition to communication shown in FIG. 14. Also, while not shown in the embodiment shown in FIG. 14, in other embodiments session-based interpretation of query 112 may also be applied to search for non-sponsored results by search engine 106a, e.g., via search back end 1410. FIG. 12 nonsponsored results 1210 illustrate the use of session-based interpretation of queries for non-sponsored results.

Search back end 1410 receives query 112 from search front end 1406. Search back end 1410 is configured to generate algorithmic search results 1416 based on query 112. Search back end 1410 may be configured to generate search results based on a received query in any manner, including according to techniques known to persons skilled in the relevant art(s). For instance, search engine back end 1410 may determine a set of documents indexed by an index (e.g., index 114 of FIG. 1) that include terms of query 112 similarly to search engine 106a, as described above. An indication of the set of documents may be included in search results 1416.

Sponsored search front end 1408 receives query 112 from search front end 1406, which requests sponsored advertisement listings from sponsored search front end 1408. Sponsored search front end 1408 sends user query 112 to geo identification module 412a, which identifies and returns geo feature(s) 1420 expressed in and/or implied for query 112.

Sponsored search front end 1408 is a communication interface for search engine 106a with advertisement selector 116a. For instance, sponsored search front end 1408 and advertisement selector 116a may be located in a common computer system, or may communicate over a network, including a LAN, a WAN, or a combination of networks, such as the Internet. Sponsored search front end 1408 transmits query 112 and geo feature(s) 1420 in an advertisement request 1422 to ad selection front end 1410.

Advertisement selection front end 1410 of advertisement selector 116a receives advertisement request 1420 from sponsored search front end 1408. Advertisement selection front end 1410 is a communication interface for advertisement selector 116a with search engine 106a. Advertisement selection front end 1410 transmits query 112 and geo feature(s) 1420 in communication 1423 to geo session cache module 414a. As described above, geo session cache module 414a determines, e.g., by looking up the session ID for query 112 in cache to determine, whether there are any qualified past queries in the same session as query 112, and if so, generates past or context geo feature(s) to potentially augment present geo feature(s) for query 112. Geo session cache module 414a may comprise a high speed read-write cache to create, update and delete sessions and session entries using session ID as a lookup key. Geo session cache module 414a transmits an empty list or a list of qualified past geo features to ad selection front end 1410 by communication 1424. The processing of present and past geo features to augment present geo feature(s) may be implemented in part or in full in any component of search system 120a with associated communications between cooperating components. In one implementation, ad selection front end 1410 returns past geo feature(s) information to sponsored front end 1408, which forwards it to geo identification module 412a for geo feature augmentation processing. The augmented features would then be sent from geo identification module 412a to sponsored search front end 1408 to ad selection front end 1410. In another implementation, ad selection front end 1410 performs geo feature augmentation processing and forwards an augmented query to ad selection back end 1412. Further, geo session cache module 414a may update or add a cache entry for the query session.

Ad selection front end 1410 sends query 112 and augmented geo features, i.e., an augmented query, to ad selection back end 1412 via communication 1426. Advertisement selection back end 1412 is configured to select one or more advertisements based on query feature(s), including augmented geo feature(s), and transmits an advertisement listing 1428 that indicates the selected one or more advertisements. Advertisement selection front end 1410 receives advertisement listing 1428, and transmits advertisement listing 1428 to sponsored search front end 1408. Advertisement selection back end 1412 may be configured to select advertisements based on query features in any manner, including in a manner as would be known to persons skilled in the relevant art(s).

Search front end 1406 receives search results 1416 from search back end 1410 and receives advertisement listing 1428 from sponsored search front end 1408. Search front end 1406 transmits search results and an advertisement listing in a query response 118. Query response 118 is received by a computer system that transmitted query 112 (e.g., computer 104a in FIG. 1). The search results included in query response 118 are displayed by the computer system (e.g., in a web page displayed by a web browser) to the user. Furthermore, advertisements corresponding to the advertisement listing may be requested (e.g., by the web browser) from an advertisement server. The advertisement server may transmit the advertisements to the computer system to be displayed to the user with the search results.

Figure 15:
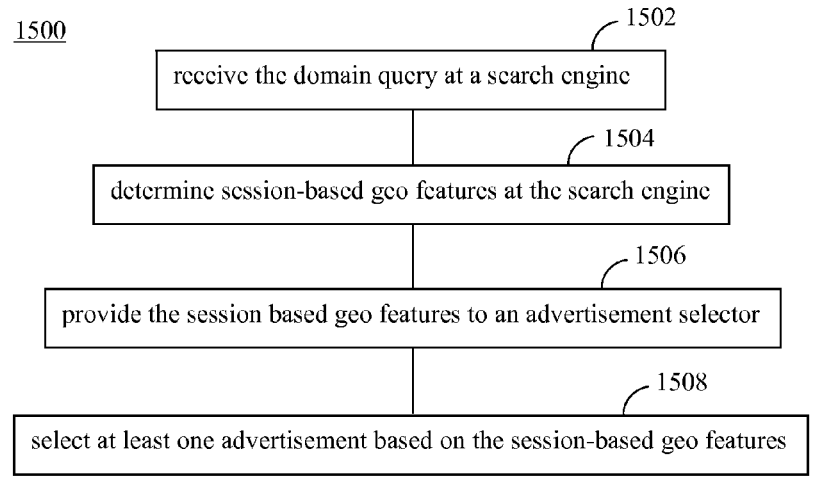
FIG. 15 shows a flowchart for session-based processing of a query at a search system, according to an example embodiment.

FIG. 15 shows a flowchart 1500 for session-based processing of a query at a search system, according to another example embodiment. In the example of flowchart 1500, the query is processed at a search engine of a search system. Flowchart 1500 begins with step 1502. In step 1502, the query is received at a search engine. In step 1504, at least one session-based query feature, e.g., geo feature, is determined at the search engine. In step 1706, the at least one session-based query feature, e.g., geo feature, is provided to an advertisement selector. In step 1708, at least one advertisement is selected based on the at least one session-based query feature.

Figure 16:
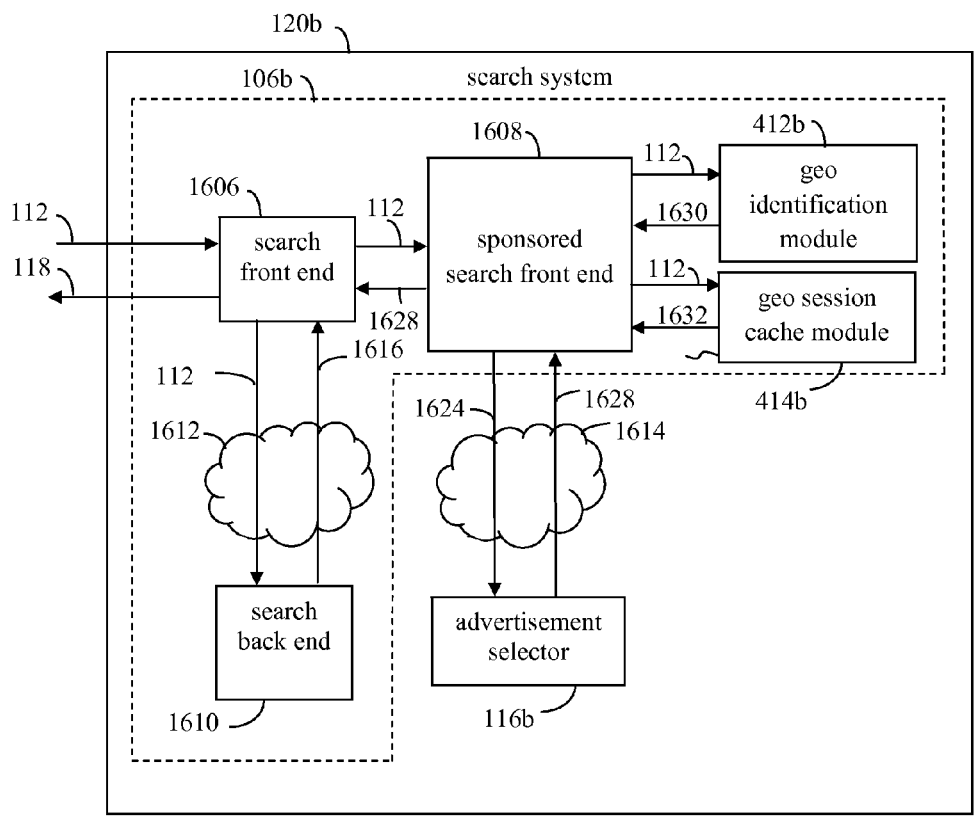
FIG. 16 shows a block diagram of a search system, according to an example embodiment.

Flowchart 1500 may be implemented by a variety of search systems. For instance, FIG. 16 shows a block diagram of a search system 120b, according to an example embodiment. Search system 120b is an example of search system 120 of FIG. 4A, and may operate according to flowchart 1500 of FIG. 15. As shown in FIG. 16, search system 120b includes a search engine 106b and an advertisement selector 116b. Search engine 106b includes a search front end 1606, a sponsored search front end 1608, a search back end 1610, a geo identification module 412b and a geo session cache module 414b. In the example of FIG. 16, search back end 1610 and search front end 1606 communicate with each other through a network 1612, and sponsored search front end 1608 and advertisement selector 116b communicate with each other though a network 1614. Network 1612 and network 1614 may be the same network or different networks. For instance, in an embodiment, search front end 1606, sponsored search front end 1608, geo identification module 412b and geo session cache module 414b may be included together in a first computer system or set of computer systems, and search back end 1610 and advertisement selector 116b may be included together in a second computer system of set of computer systems. The elements of search system 1600 are described as follows.

As shown in FIG. 16, search front end 1606 receives query 112. Search front end 1606 is an interface for search engine 1600 for receiving queries from users. For instance, search front end 1606 may generate a search engine user interface (e.g., a web page displayable by a web browser) that provides a search engine entry box and search button 702 that enable users to input queries.

Search back end 1610 receives query 112 from search front end 1606, which requests algorithmic search results from search back end 1610. Search back end 1610 is configured to generate search results 1616 based on the user query. Search back end 1610 may be configured to generate search results based on a received query in any manner, including according to techniques known to persons skilled in the relevant art(s). For instance, search engine back end 1610 may determine a set of documents indexed by an index (e.g., index 114 of FIG. 1) that include terms of query 112 similarly to search engine 106, as described above. An indication of the set of documents may be included in search results 1616.

While not shown in the embodiment shown in FIG. 16, there may be communication between components in addition to communication shown in FIG. 16. Also, while not shown in the embodiment shown in FIG. 16, in other embodiments session-based interpretation of query 112 may also be applied to search for non-sponsored results by search engine 106b, e.g., via search back end 1610. FIG. 12 nonsponsored results 1210 illustrate the use of session-based interpretation of queries for non-sponsored results.

Sponsored search front end 1608 receives query 112 from search front end 1606, which requests sponsored advertisement listings from sponsored search front end 1608. Sponsored search front end 1608 is a communication interface for search engine 106b with advertisement selector 116b. For instance, sponsored search front end 1608 and advertisement selector 116b may be located in a common computer system, or may communication over a network, including a LAN, a WAN, or a combination of networks, such as the Internet.

Sponsored search front end 1608 transmits query 112 to geo identification module 412b, which identifies and returns present geo feature(s) expressed in and/or implied for query 112 via communication 1630. Sponsored search front end 1608 transmits query 112 to geo session cache module 414b, which determines, e.g., by looking up the session ID for query 112 in cache to determine, whether there are any qualified past queries in the same session as query 112, and if so, generates past or context geo feature(s) to potentially augment present geo feature(s) for query 112. Geo session cache module 414b may comprise a high speed read-write cache to create, update and delete sessions and session entries using session ID as a lookup key. Geo session cache module 414b transmits an empty list or a list of qualified past geo features to sponsored search front end 1608 by communication 1632.

The processing of present and past geo features to augment present geo feature(s) may be implemented in part or in full in any component of search system 120b with associated communications between cooperating components. In one implementation, sponsored front end 1608 forwards past geo feature(s) to geo identification module 412b for geo feature augmentation processing. The augmented features would then be sent from geo identification module 412b to sponsored search front end 1608 to ad selector 116b. In another implementation, sponsored search front end 1608 performs geo feature augmentation processing and forwards an augmented query to ad selector 116b. Further, geo session cache module 414b may update or add a cache entry for the query session.

Sponsored search front end 1608 transmits query 112 and augmented geo feature(s) or an augmented query in an advertisement request 1624 to advertisement selector 116b. Advertisement selector 116b receives augmented query 1624 from sponsored search front end 1608.

Advertisement selector 116b is configured to select one or more advertisements based on augmented query feature(s) or augmented query 1624, and transmits an advertisement listing 1628 that indicates the selected one or more advertisements. Advertisement selector 116b may be configured to select advertisements based on query features in any manner, including in a manner as would be known to persons skilled in the relevant art(s). Sponsored search front end 1608 receives advertisement listing 1628, and transmits advertisement listing 1628 to search front end 1606.

Search front end 1606 receives search results 1616 from search back end 1610 and receives advertisement listing 1628 from sponsored search front end 1608. Search front end 1606 transmits search results and an advertisement listing in a query response 118. Query response 118 is received by a computer system that transmitted query 112 (e.g., computer 104a in FIG. 1). The search results included in query response 118 are displayed by the computer system (e.g., in a web page displayed by a web browser) to the user. Furthermore, advertisements corresponding to the advertisement listing may be requested (e.g., by the web browser) from an advertisement server. The advertisement server may transmit the advertisements to the computer system to be displayed to the user with the search results.

Note that the search system embodiments presented in FIGS. 1, 3, 4A, 4B, 5, 6 and 13-16 are provided for purposes of illustration. Search embodiments may be configured in further ways, including as modified and/or combined versions of these search system embodiments, as would be known to persons skilled in the relevant art(s) from the teachings herein and from information know to persons skilled in the relevant art.

VI. Example Computer Implementations

Search engine 106, advertisement selector 116, index 114, search system 120, method 300, session-based query processing module 404, geo identification module 412, geo session cache module 414, method 500, data structure 600, method 1300, method 1500, as well as any and all components, steps and functions therein and/or further embodiments described herein may be implemented in hardware, software, firmware, or any combination thereof. For example, search engine 106, advertisement selector 116, index 114, search system 120, method 300, session-based query processing module 404, geo identification module 412, geo session cache module 414, method 500, data structure 600, method 1300, method 1500, as well as any and all components, steps and functions therein and/or further embodiments described herein may be implemented as computer program code configured to be executed in one or more processors. Alternatively, search engine 106, advertisement selector 116, index 114, search system 120, method 300, session-based query processing module 404, geo identification module 412, geo session cache module 414, method 500, data structure 600, method 1300, method 1500, as well as any and all components, steps and functions therein and/or further embodiments described herein may be implemented as hardware logic/electrical circuitry.

Figure 17:
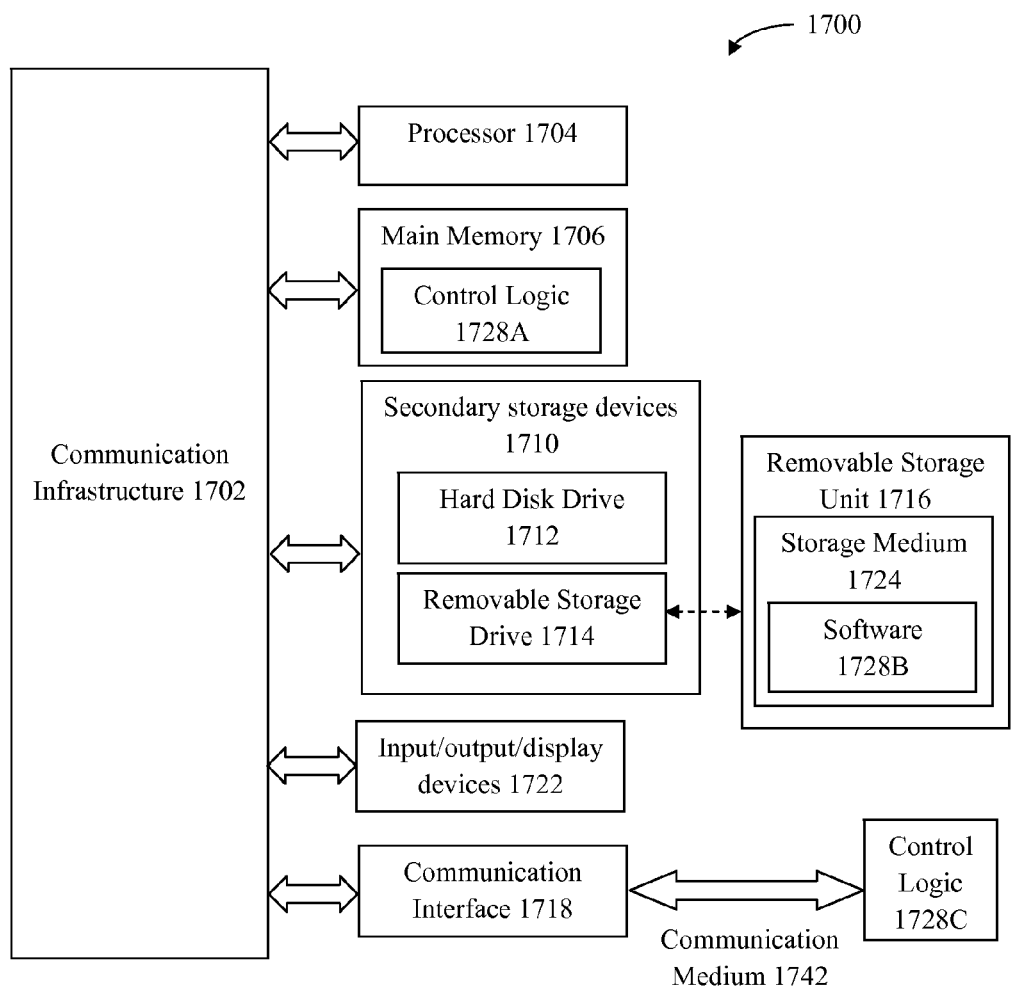
FIG. 17 is a block diagram of a computer in which embodiments may be implemented.

FIG. 17 is a block diagram of a computer in which embodiments may be implemented. Embodiments, such as those involving systems, methods/processes, devices, apparatuses, modules, components, computer readable media, data structures, etc., may be implemented using one or more well known servers/computers, such as computer 1700 shown in FIG. 17.

Computer 1700 can be any commercially available and well known computer capable of performing the functions described herein, such as computers available from International Business Machines, Apple, Sun, HP, Dell, Cray, etc. Computer 1700 may be any type of computer, including a desktop computer, a server, etc.

Computer 1700 includes one or more processors (also called central processing units, or CPUs), such as a processor 1704. Processor 1704 is connected to a communication infrastructure 1702, such as a communication bus. In some embodiments, processor 1704 can simultaneously operate multiple computing threads.

Computer 1700 also includes a primary or main memory 1706, such as random access memory (RAM). Main memory 1706 has stored therein control logic 1728A (computer software), and data.

Computer 1700 also includes one or more secondary storage devices 1710. Secondary storage devices 1710 include, for example, a hard disk drive 1712 and/or a removable storage device or drive 1714, as well as other types of storage devices, such as memory cards and memory sticks. For instance, computer 1700 may include an industry standard interface, such a universal serial bus (USB) interface for interfacing with devices such as a memory stick. Removable storage drive 1714 represents a floppy disk drive, a magnetic tape drive, a compact disk drive, an optical storage device, tape backup, etc.

Removable storage drive 1714 interacts with a removable storage unit 1716. Removable storage unit 1716 includes a computer useable or readable storage medium 1724 having stored therein computer software 1728B (control logic) and/or data. Removable storage unit 1716 represents a floppy disk, magnetic tape, compact disk, DVD, optical storage disk, or any other computer data storage device. Removable storage drive 1714 reads from and/or writes to removable storage unit 1716 in a well known manner.

Computer 1700 also includes input/output/display devices 1922, such as monitors, keyboards, pointing devices, etc.

Computer 1700 further includes a communication or network interface 1718. Communication interface 1718 enables the computer 1700 to communicate with remote devices. For example, communication interface 1718 allows computer 1700 to communicate over communication networks or mediums 1742 (representing a form of a computer useable or readable medium), such as LANs, WANs, the Internet, etc. Network interface 1718 may interface with remote sites or networks via wired or wireless connections.

Control logic 1728C may be transmitted to and from computer 1700 via the communication medium 1742.

Any apparatus or manufacture comprising a computer useable or readable medium having control logic (software) stored therein is referred to herein as a computer program product or program storage device. This includes, but is not limited to, computer 1700, main memory 1706, secondary storage devices 1710, and removable storage unit 1716. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable media include, but are not limited to, a hard disk, a removable magnetic disk, a removable optical disk, flash memory cards, digital video disks, random access memories (RAMs), read only memories (ROM), and the like. In greater detail, examples of such computer-readable media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may, for example, store computer program logic, e.g., program modules, comprising computer executable instructions that, when executed, provide and/or maintain search engine 106, advertisement selector 116, index 114, search system 120, method 300, session-based query processing module 404, geo identification module 412, geo session cache module 414, method 500, data structure 600, method 1300, method 1500, as well as any and all components, steps and functions therein and/or further embodiments of the present invention described herein. Embodiments are directed to computer program products comprising such logic (e.g., in the form of program code or software as well as firmware) stored on any computer useable medium. Such program code, when executed in one or more processors, causes a device to operate as described herein.

Embodiments of contextual interpretation of user queries can be implemented with software, hardware, and/or operating systems other than those described herein. Any software, hardware, and operating system implementations suitable for performing the functions described herein can be used. Embodiments of contextual interpretation of user queries can be implemented using computer readable media comprising computer-executable instructions to implement session-based processing of individual user queries.

VII. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

The proper interpretation of subject matter described and claimed herein is limited to patentable subject matter under 35 U.S.C. §101. As described and claimed herein, a method is a process defined by 35 U.S.C. §101. As described and claimed herein, each of a device, apparatus, machine, system, computer, module, computer readable media, media, is a machine or manufacture defined by 35 U.S.C. §101.

What is claimed is:

1. A method executable by a computer having a processor and memory, the method comprising:
    receiving a user query input to a search engine from a user computing device;
    determining, with the processor, that the user query input to the search engine does not specify at least one present geographic feature identifying a geographic location associated with the user query;
    retrieving, from a database, past geographic features associated with past user queries from the user computing device, wherein the past geographic features identify a geographic location associated with the past user queries;
    determining, with the processor, at least one qualified past geographic feature for at least one past user query, wherein the at least one qualified past geographic feature is determined based on a time interval between the user query and the at least one past user query;
    augmenting, with the processor, the at least one present geographic feature with the at least one qualified past geographic feature to determine an augmented geographic feature, wherein the augmented geographic feature identifies a geographic location to apply to the user query that does not specify the at least one present geographic feature,
    further wherein the augmented geographic feature is determined by selecting the most relevant qualified past geographic feature from the past geographic features;
    determining, with the processor, at least one sponsored search result using the augmented geographic feature by selecting the sponsored search result using the geographic location identified by the augmented geographic feature;
    determining, with the processor, at least one non-sponsored search result using the at least one present geographic feature, such that different geographic features are used to determine the sponsored search results as compared with the non-sponsored search results for the user query; and
    delivering, with the processor, the at least one sponsored search result and the at least one non-sponsored search result to be displayed on a web page of the user computing device.

2. The method of claim 1, further comprising:
    qualifying the at least one qualified past geographic feature for at least one past query by determining that the at least one past user query and the user query were received during a same session.

3. The method of claim 2, wherein the same session comprises a same geographic session based on queries having a same geographic context.

4. The method of claim 3, wherein query geographic context is determined by query pattern recognition.

5. The method of claim 2, further comprising:
    further qualifying the at least one past geographic feature for at least one past query by determining that the at least one past query and the user query were received within a qualifying time interval.

6. The method of claim 1, further comprising:
    determining weights for the at least one present geographic feature and the at least one qualified past geographic feature;
    merging the weighted at least one past geographic feature and the weighted at least one present geographic features into the augmented at least one present geographic feature;
    wherein the merging comprises eliminating the weighted at least one qualified past feature and the weighted at least one present geographic features whose weight is less than a threshold weight.

7. The method of claim 1, further comprising:
    determining weights for the at least one present geographic feature and the at least one qualified past geographic feature;
    merging the weighted at least one past geographic feature and the weighted at least one present geographic features into the augmented at least one present geographic feature,
    wherein the merging comprises eliminating duplicate features and adjusting a weight of a feature whose duplicate was eliminated.

8. The method of claim 1, further comprising:
    storing the augmented at least one present geographic feature as an entry in a data structure used to interpret subsequent queries.

9. The method of claim 8, wherein a stored entry in the data structure comprises a session identifier, at least one geographic feature and a query timestamp.

10. The method of claim 1, wherein the method is selectively applied when geographic intent is not expressed in the user query and is not applied when geographic intent is expressed in the user query.

11. The method of claim 1, where augmenting comprises:
    weighting the at least one present geographic feature;
    weighting the at least one qualified past geographic feature; and
    merging the weighted at least one past geographic feature and the weighted at least one present geographic feature into the augmented at least one present geographic feature.

12. The method of claim 1, wherein selecting the most relevant qualified past geographic feature from the past geographic features comprises:
    assigning a weight to each of the past geographic features based on whether each of the past geographic features was explicitly contained in the user query or derived from the user query, and
    adjusting the assigned weights based on elapsed time in order to emphasize more recent user queries and past geographic features.

13. The method of claim 12, wherein weighted the past geographic features based on whether each of the past geographic features was explicitly contained in the user query or implied by the user query further comprises:
    identifying each of the past geographic features that was explicitly contained in the user query and increasing the assigned weight of the past geographic feature when it was explicitly contained in the user query, identifying each of the past geographic features that was derived from the user query and decreasing the assigned weight of the past geographic feature when it was derived from the user query.

14. A search system, comprising:

a processor and a memory;

a session-based query processing module executable by the processor and that interprets a user query based on the user query and previous queries accumulated during a session with a computing device of the user, wherein the session-based query processing module is configured to:

receive the user query from the user computing device;

determine that user query from the user computing device does not specify at least one present geographic feature;

determine at least one present geographic feature for the user query;

retrieve, from a database, past geographic features associated with past user queries from a related user computing device;

determine at least one past geographic feature for at least one past user query received during the same session as the user query;

augment the user query with the at least one past geographic feature;

determine a set of non-sponsored search results using the at present geographic feature; and determine a set of sponsored search results using the augmented user query and the at least one past geographic feature, such that different geographic features are used to determine the non-sponsored search results and the sponsored search results; and deliver the set of non-sponsored search results and the set of sponsored search results to be displayed on a web page of the user computing device.

15. The search system of claim 14, wherein the session comprises a geographic session.

16. The search system of claim 14, wherein the session-based query module comprises:

a geographic identification module that identifies geographic features in queries; and a geographic session cache module configured to store past geographic features for past queries.

17. The search system of claim 14, where the session-based query processing module is further configured to:

weight the at least one present geographic feature;

weight the at least one qualified past geographic feature; and merge the weighted at least one past geographic feature and the weighted at least one present geographic feature into the augmented at least one present geographic feature.

18. A non-transitory computer readable medium comprising computer-executable instructions that, when executed by a computer having a processor and memory, perform session-based query processing that interprets a user query based on the user query and previous queries accumulated during a session with a computing device of the user by:

determining, with the processor, at least one present geographic feature for the user query;

determining, with the processor, at least one past geographic feature for at least one past user query received during the session;

augmenting, with the processor, the at least one present geographic feature with the at least one past geographic feature to determine an augmented geographic feature, wherein the augmented geographic feature is determined by selecting the most relevant past geographic feature determined during the session;

applying, with the processor, the augmented geographic feature to the user query to generate an interpreted user query that includes the augmented geographic feature;

determining, with the processor, a set of non-sponsored search results based on the at least one present geographic feature;

determining, with the processor, a set of sponsored search results based on the interpreted user query, such that different geographic features are used to determine the non-sponsored search results and the sponsored search results; and delivering, with the processor, the set of non-sponsored search results and the set of sponsored search results to be displayed on a web page of the user computing device.

19. The non-transitory computer readable medium of claim 18, wherein the session comprises a geographic session.

20. The non-transitory computer readable medium of claim 18, further comprising instructions executable by the processor to:

weight the at least one present geographic feature;

weight the at least one qualified past geographic feature; and merge the weighted at least one past geographic feature and the weighted at least one present geographic feature into the augmented at least one present geographic feature.

* * * * *